US007930371B2

(12) United States Patent
Furuyama et al.

(10) Patent No.: US 7,930,371 B2
(45) Date of Patent: Apr. 19, 2011

(54) DEPLOYMENT METHOD AND SYSTEM

(75) Inventors: Yusuke Furuyama, Yokohama (JP);
Yoshifumi Takamoto, Kokubunji (JP);
Keisuke Hatasaki, Kawasaki (JP);
Sachiko Ishikawa, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 456 days.

(21) Appl. No.: 12/039,435

(22) Filed: Feb. 28, 2008

(65) Prior Publication Data

US 2009/0132683 A1    May 21, 2009

(30) Foreign Application Priority Data

Nov. 15, 2007 (JP) ................................ 2007-296215

(51) Int. Cl.
  *G06F 15/177* (2006.01)
  *G06F 15/173* (2006.01)
(52) U.S. Cl. .................................... 709/220; 709/223
(58) Field of Classification Search .................... 709/220
    See application file for complete search history.

(56) References Cited

U.S. PATENT DOCUMENTS

| 7,356,679 B1* | 4/2008 | Le et al. ............................ 713/1 |
| 7,644,264 B1* | 1/2010 | Olsen ................................. 713/2 |
| 2003/0212775 A1* | 11/2003 | Steele et al. ................... 709/223 |
| 2005/0216911 A1 | 9/2005 | Yen et al. |
| 2009/0006434 A1* | 1/2009 | Fowler et al. ................. 707/101 |

* cited by examiner

*Primary Examiner* — Jeffrey Pwu
*Assistant Examiner* — Shaq Taha
(74) *Attorney, Agent, or Firm* — Mattingly & Malur, P.C.

(57) ABSTRACT

A deployment method and system in the OS deployment software are disclosed in which the deployment is possible to server units having various hardware configurations. In a computer system, a disk image of a deployer server unit is managed by a management server and a deployee server unit is connected to the management server through a network. The hardware configuration information of the deployer server unit and a hardware configuration tolerance list obtained from a driver information file in the disk image are held in the disk image. In response to a deployment instruction from the user, the management server compares the hardware configuration of the deployer server unit with that of the deployee server unit, and by detecting the difference therebetween, changes the deployment method in accordance with the detected difference.

20 Claims, 18 Drawing Sheets

FIG. 7

SERVER UNIT MANAGEMENT TABLE 111

| PHYSICAL SERVER IDENTIFIER 701 | CPU 702 | MEMORY (GB) 703 | DEVICE 704 | CONNECTION DISK 705 | VIRTUALIZED STATE IDENTIFIER 706 | FUNCTION 707 |
|---|---|---|---|---|---|---|
| SERVER 1 | 2GHz ×2 | 24 | NIC1:MAC1 | DISK 1 (300GB) | VIRTUALIZATION MECHANISM USED | NIC1: TEAMING, VLAN |
| SERVER 2 | 2GHz ×1 | 16 | NIC1:MAC3 HBA1:WWN1 | DISK 1 (600GB) | VIRTUALIZATION MECHANISM NOT USED | NIC3: TEAMING, VLAN HBA1: LUN MASKING, N-PORT VIRTUALIZATION |
| SERVER 3 | 3GHz ×4 | 64 | NIC1:MAC4 NIC2:MAC5 HBA1:WWN2 HBA2:WWN3 | DISK 1 (500GB) DISK 2 (500TB) | VIRTUALIZATION MECHANISM NOT USED | NIC1: TEAMING, VLAN NIC2: TEAMING HBA1: LUN MASKING HBA2: N-PORT VIRTUALIZATION, LUN MASKING, FC-TAPE COMPATIBLE |
| SERVER 4 | 3GHz ×2 | 64 | NIC1:MAC6 NIC2:MAC7 HBA1:WWN4 HBA2:WWN5 | DISK 1 (1TB) DISK 2 (1TB) | VIRTUALIZATION MECHANISM NOT USED | NIC1: TEAMING, VLAN NIC2: TEAMING |

FIG. 8

VIRTUAL SERVER MANAGEMENT TABLE 113

| 801 VIRTUALI-ZATION MECHANISM IDENTIFIER | 802 WORKING PHYSICAL SERVER IDENTIFIER | 803 VIRTUAL SERVER IDENTIFIER | 804 ALLOTMENT RESOURCES |
|---|---|---|---|
| VIRTUALI-ZATION UNIT 1 | PHYSICAL SERVER 1 | VIRTUAL SERVER 1 | CPU: 2GHz × 2<br>MEMORY: 20 GB<br>vNIC1: MAC1<br>VIRTUAL DISK: DISK 1 |
| VIRTUALI-ZATION UNIT 3 | PHYSICAL SERVER 3 | VIRTUAL SERVER 3 | CPU: 3GHz × 2<br>MEMORY: 32 GB<br>vNIC1: MAC4<br>VIRTUAL DISK: DISK 1 |

FIG. 9

DEPLOYED IMAGE MANAGEMENT TABLE 112

| 901 IMAGE IDENTIFIER | 902 OS TYPE IDENTIFIER | 903 BACKUP SERVER UNIT IDENTIFIER | 904 BACKUP DATE |
|---|---|---|---|
| IMAGE 1 | OS 1 | SERVER 1 | 2007/07/20 11:16 |
| IMAGE 2 | OS 2 | SERVER 2 | 2007/02/01 12:01 |

FIG. 10

DRIVER MANAGEMENT TABLE 114

| DRIVER IDENTIFIER (1001) | OS TYPE IDENTIFIER (1002) | DRIVER APPLICATION DEVICE IDENTIFIER (1003) | FUNCTION (1004) |
|---|---|---|---|
| DRIVER 1 | OS 1 | NIC1 NIC2 | NIC1: TEAMING, VLAN NIC2: TEAMING |
| DRIVER 2 | OS 1 | NIC3 | NIC3: TEAMING |
| DRIVER 3 | OS 1 | HBA1 | HBA1: LUN MASKING, N-PORT VIRTUALIZATION |
| DRIVER 4 | OS 2 | NIC1 NIC2 | NIC1: TEAMING, VLAN NIC2: TEAMING |

FIG. 11

TOLERANCE LIST 602

| DEVICE TYPE (1101) | TOLERANT DEVICE IDENTIFIER LIST (1102) | PERFORMANCE VALUE (1103) | FUNCTION (1104) | DRIVER INFORMATION (1105) |
|---|---|---|---|---|
| NIC | NIC1 | 1000Mbps | TEAMING, VLAN | DRIVER 1, IN DISK IMAGE |
| | NIC2 | 100Mbps | TEAMING | DRIVER 2, DRIVER DISK |
| HBA | HBA1 | 2Gbps | LUN MASKING, N-PORT VIRTUALIZATION | DRIVER 3, IN DISK IMAGE |
| | HBA2 | 4Gbps | LUN MASKING, FC-TAPE COMPATIBLE | DRIVER 5, DRIVER DISK |

FIG. 12

BACKUP HARDWARE CONFIGURATION INFORMATION 601

| SERVER UNIT IDENTIFIER (1201) | CPU (1202) | MEMORY (GB) (1203) | DEVICE (1204) | PERFORMANCE VALUE (1205) | PARTITION CONFIGURATION (1206) | FUNCTION (1207) |
|---|---|---|---|---|---|---|
| SERVER 1 | 2GHz ×2 | 24 | NIC1:MAC1 HBA1:WWN1 HBA1:WWN2 | NIC1: 1000Mbps HBA1: 2Gbps | PARTITION 1 (30 GB) PARTITION 2 (120 GB) | NIC1: TEAMING, VLAN HBA1: N-PORT VIRTUALIZATION, LUN MASKING |

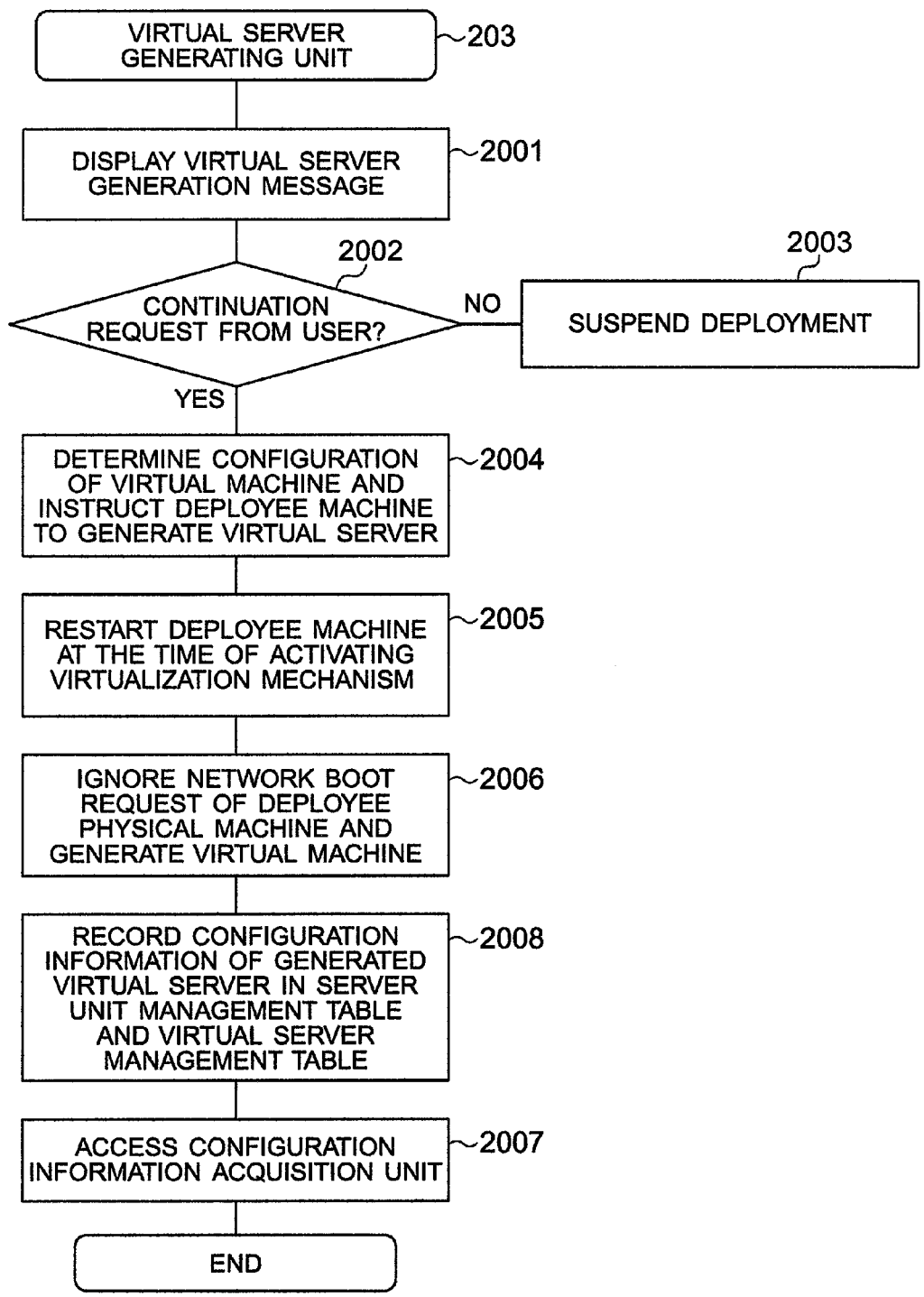

DEPLOYMENT METHOD AND SYSTEM

BACKGROUND OF THE INVENTION

This invention relates to the generalization of the OS deployment.

Generally, the operating system (OS) is installed by the manager inserting the CD-ROM or the like for installation directly into a server unit. This installation method, though applicable to an environment having a small number of servers, consumes a great amount of both labor and time in an environment involving a large number of servers. In the environment having a great number of servers, therefore, the OS deployment software is often used. The OS deployment software operates on an management server independent of the servers to be installed with the OS and has the function to distribute (deploy) the OS to the servers.

The term "distribution (deployment)" is defined as the operation in which the image data installed with the OS and stored in advance is copied to the disks of the severs to be installed with the OS (hereinafter referred to as the "target servers"). This operation is specifically described below. First, a target server, when newly connected to the LAN connecting to the management server and power switched on, gives a network boot request to the management server.

With the response from the management server to this request, the communication starts between the management server and the target server. After the communication starts, the management server copies the image data designated by the user through the network to the disk of the target server.

In the OS deployment software, assume that the backup image generated by a backup source server unit is deployed to a deployee server unit. In the case where the backup source server unit and the deployee server unit are different in hardware configuration from each other, the problem is posed that the booting is impossible, or even if the booting is possible, an expected operation cannot be realized after deploying an image.

The reason why the aforementioned problem is posed in the case where the backup source server unit and the deployee server unit are different in hardware configuration from each other is that the device driver for the hardware of the backup source server unit and the device driver for the hardware of the deployee may fail to coincide with each other. Assume, for example, that the HBA (host bus adaptor) of the backup source server unit and the HBA of the deployee server unit are different from each other and that the HBA driver installed in the OS of the backup source server unit is not compatible with the HBA of the deployee server unit. In this case, even in the case where the deployee server unit is restarted after deploying the image to the deployee server unit, the deployee server unit cannot be booted.

In the prior art, however, it is difficult to judge whether the hardware specification intended for deployment is different or not.

SUMMARY OF THE INVENTION

Accordingly, it is an object of this invention to provide a deployment method for a computer system comprising a deployer server unit, a management server for managing the disk image including the backup data of the deployer server unit and a deployee server unit connected to the management server through a network, wherein the disk image holds the hardware configuration information of the backup source server unit and a hardware configuration tolerance list obtained from the driver information file in the disk image, and wherein the hardware configuration of the deployer server unit and that of the deployee server unit are compared with each other to detect the difference therebetween.

Another object of this invention is to provide a deployment method and system in which the disk image generated by a given deployer server unit can be deployed to a deployee server unit having a different hardware configuration.

BRIEF DESCRIPTION OF THE DRAWINGS

FIG. 7 shows an example of a server unit management table.

FIG. 8 shows an example of a virtual server management table.

FIG. 9 shows an example of a deployed image management table.

FIG. 10 shows an example of a driver management table.

FIG. 11 shows an example of a tolerance list.

FIG. 12 shows an example of the backup source hardware configuration information.

FIG. 20 shows an example of a flowchart for a virtual server generating unit.

DETAILED DESCRIPTION OF THE INVENTION

Embodiments of the invention are explained below with reference to the drawings.

Embodiment 1

Figure 1:
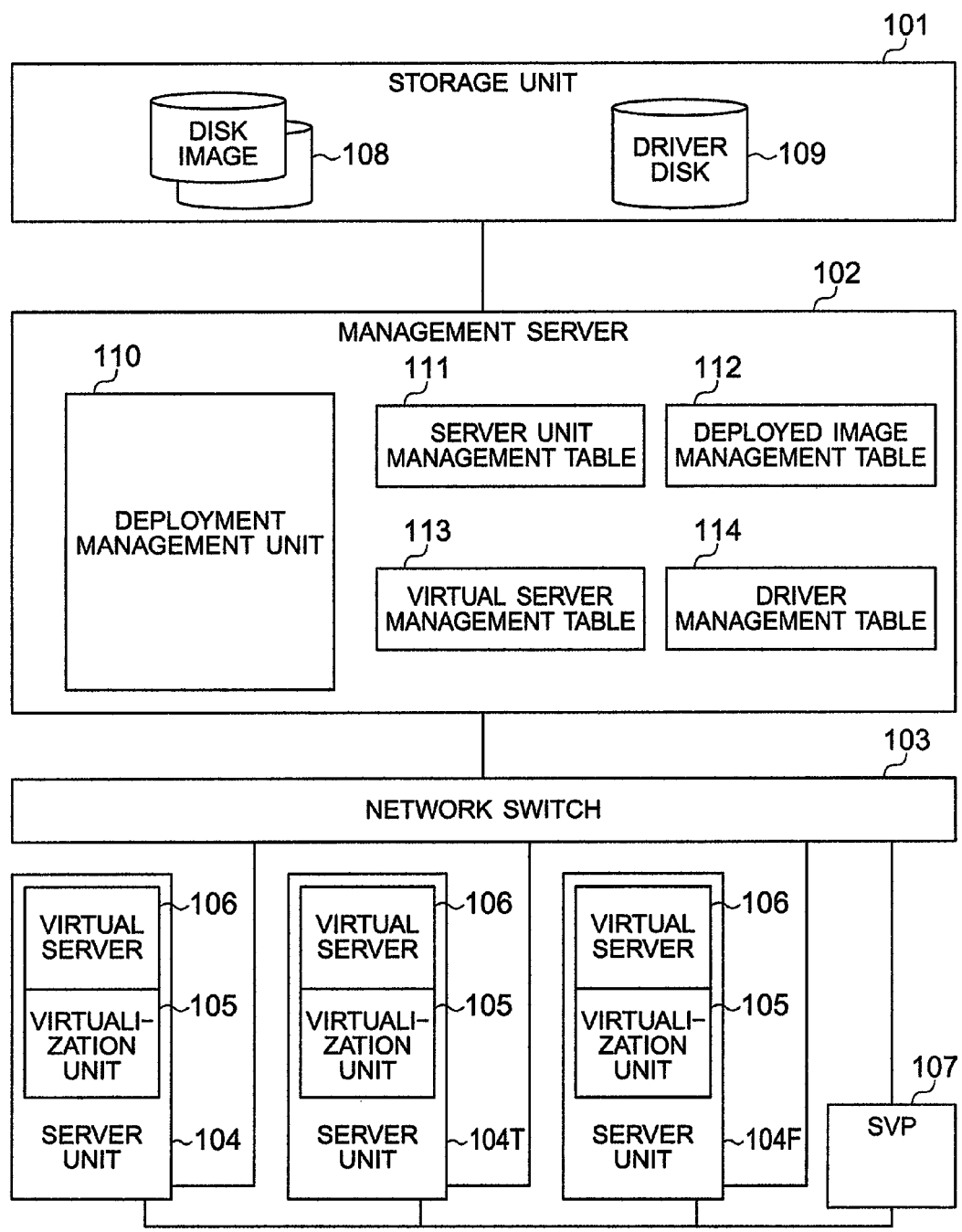
FIG. 1 shows a diagram showing an example of the general configuration.

FIG. 1 shows an example of a general configuration according to an embodiment. A management server 102 is the center of control operation in this embodiment. The management server 102 is configured of a deployment management unit 110 and various tables (111 to 114). The management server 102 is connected to a storage unit 101. Also, the management server 102 is connected to a server unit 104 and a SVP (service processor) 107 through a network switch 103. As long as a virtualization unit 105 on each server unit is in operation, the management server 102 is connected to a corresponding virtual server 106. The management server 102 and the servers such as the server unit 104 may be called a computer.

The management server 102 is configured of a deployment management unit 110, a server unit management table 111, a deployment image management table 112, a virtual server management table 113 and a driver management table 114. The management server 102 has the function of acquiring the backup data of the image from the server unit 104 and deploying the image to the server unit 104. In the deploy operation according to this embodiment, the disk image 108 is developed in the disk built in the deployee server unit 104T so that an OS equivalent to the OS working in the backup server unit 104F and a business program are copied to the deployee server unit 104T. The management server 102 has the function of generating the disk image 108 by imaging the data from the server unit 104 at the time of the backup operation, and deploying the image to the server unit 104 at the time of deployment.

The server unit 104 to which the disk image is distributed is called the deployee server unit 104T, and the server unit 104 that has acquired the distributed disk image may be called the image acquiring server 104F, the backup server 104F or the deployee server 104F. The server unit 104 may act as a backup server 104F or a deployee server 104T. The server units 104 may or may not have the same hardware configuration.

The deploy system according to this embodiment has the function of generating the backup image with the unique information of the backup server unit removed from the contents of a disk unit having recorded therein the operating system (OS) working during in the backup server unit, the function of holding the backup image in another disk unit and copying it to the disk unit of the deployee server unit in response to a deploy instruction from the user, and the function of setting the unique information of the deployee server unit after copying.

Incidentally, the unique information of the server unit is, for example, an IP address allotted to NIC or the computer name. The disk image 108 may include the backup data of the backup server unit 104F.

The storage unit 101 has a disk image 108 for each backup server unit 104 and a driver disk 109 for storing various device drivers. The driver disk 104 stores the drivers required for the OS operation and is used for installing the driver short of the OS operation at the time of deploying the image from the management server 102 to the server unit 104.

Each server unit 104 includes a virtualization unit 105 and a virtual server 106. The virtualization unit 105 has the function of dividing the resources such as the memory or the processor of the server unit 104 and the function of emulating an input/output device such as an input/output interface not included in the server unit 104 and allotting it to the virtual server 106. The virtual server 106 is allotted a part of the resources of the server unit 104 and has an OS operation environment independent of the server unit 104. Incidentally, a plurality of the virtual servers 106 may be provided for each server unit 104.

The SVP 107 connected to the management server 102 through the network switch 103 to switch on/off the power of the server units 104 and notify the management server 102 of any fault which may develop in the server units 104. Also, the SVP 107 can manage the memory capacity of the server units and the hardware configuration such as the type of the processor and the input/output interface connected thereto on the one hand and can transfer the information in accordance with the request for acquisition of the hardware configuration information from the management server 102.

The server unit management table 111 stores the information of each server units 104 connected to the network switch 103. The deployment image management table 112 stores the identification information such as the OS type of the disk image generated. The virtual server management table 113 stores the information of the virtual server 106 operating on each server unit 104. The driver management table 114 stores the information of the various device drivers stored in the driver disk 109. This embodiment represents an example in which the management server 102 generates the disk image for a server unit 104 and deploys the image thus generated to another server unit 104.

Figure 2:
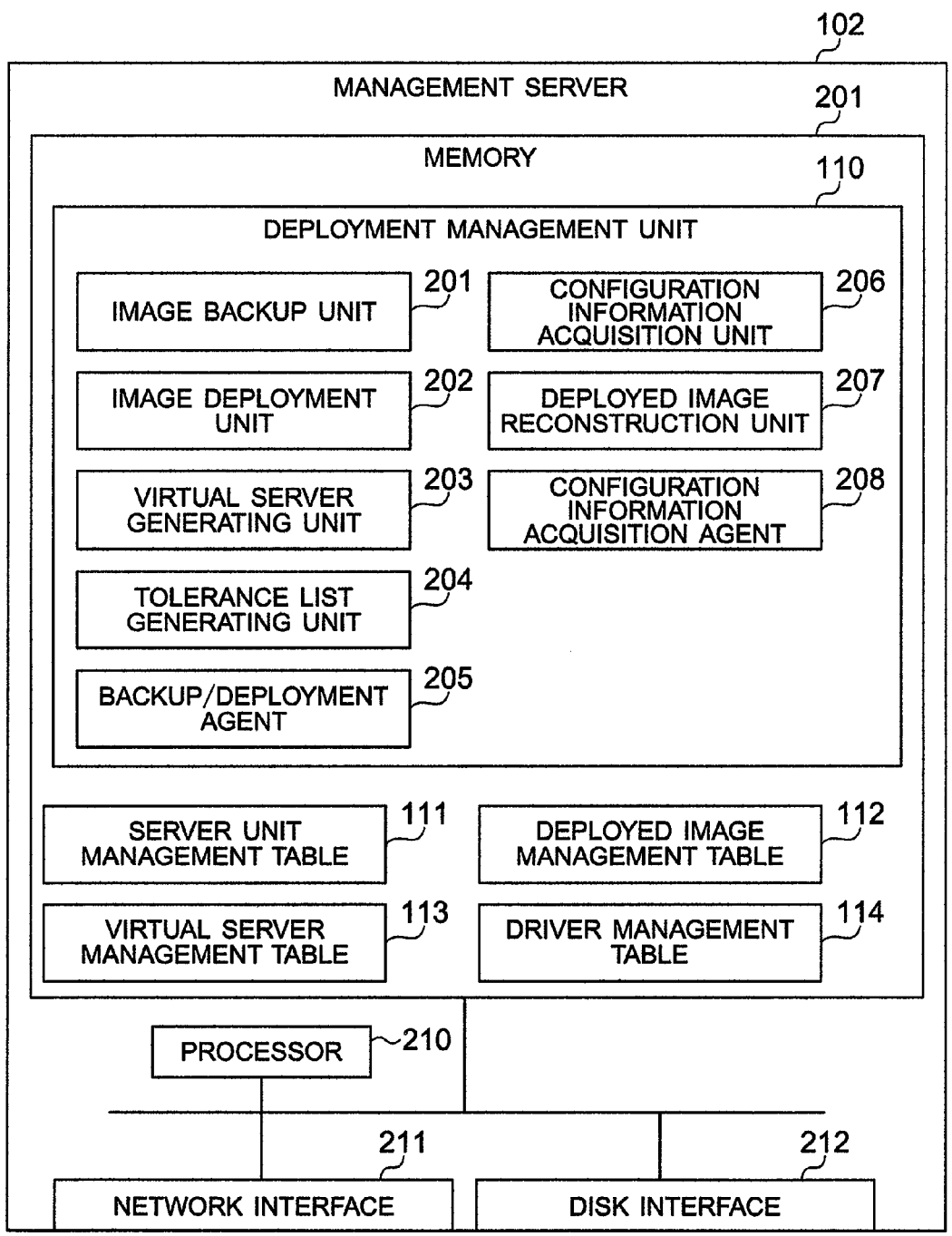
FIG. 2 is a diagram showing an example of the configuration of the management server.

FIG. 2 is a diagram showing an example of the configuration of the management server 102. The management server 102 is configured of a memory 201, a processor 210, a network interface 211 and a disk interface 212. The network interface 211 and the disk interface 212 are collectively called the device. Also, it is sometimes called the input/output device or the input/output interface.

The memory 201 stores the deployment management unit 110, the server unit management table 111, the deployed image management table 112, the virtual server management table 113 and the driver management table 114. The deployment management unit 110 is configured of an image backup unit 201, an image deployment unit 202, a virtual server generating unit 203, a tolerance list generating unit 204, a backup deployment agent 205, a configuration information acquisition unit 206, a deployed image reconstruction unit 207 and a configuration information acquisition agent 208.

The various programs including the image backup unit 201, the image deployment unit 202, the virtual server generating unit 203, the tolerance list generating unit 204, the backup/deployment agent 205, the configuration information acquisition unit 206, the deployed image reconstruction unit 207 and the configuration information acquisition agent 208 stored in the memory 201 are executed by the processor 210 thereby to execute the various processes including the image backup, image deployment, virtual server generation, tolerance list generation, backup/deployment agent processing, configuration information acquisition, deployed image reconstruction and the configuration information acquisition agent processing.

The programs including the image backup unit 201, the image deployment unit 202, the virtual server generating unit 203, the tolerance list generating unit 204, the backup/deployment agent 205, the configuration information acquisition unit 206, the deployed image reconstruction unit 207 and the configuration information acquisition agent 208 can be implemented also as hardware in the form of an integrated circuit as a processor for executing each process.

The image backup unit 201 generates the disk image 108 of each server unit 104 or virtual server 106. The disk image is defined as data including the complete contents and structure of a file system stored in one file. In the normal backup operation, the boot information, the portion or the physical information locked by the OS cannot be backed up. Once the disk image is backed up, however, the backup data including all the aforementioned information can be generated. The disk image is sometimes called the image file.

The image deployment unit 202 deploys the image disk to the various server units 104. The backup/deployment agent 205 executes the backup or the deploy operation on the server unit intended for backup or deployment, respectively.

The virtual server generating unit 203 activates the virtualization unit 105 on the server unit to generate the virtual server 106. The tolerance list generating unit 204 generates a tolerance list 602 listing the devices tolerable as deployee devices.

The configuration information acquisition unit 206 acquires the configuration information of the server units 104 connected to the network switch 103. The deployed image reconstruction unit 207 reconstructs the disk image not adapted for the deployee server unit. The configuration information acquisition agent 208 acquires the information on the server unit intended for acquisition of the configuration information and transmits it to the configuration information acquisition unit 206.

Figure 3:
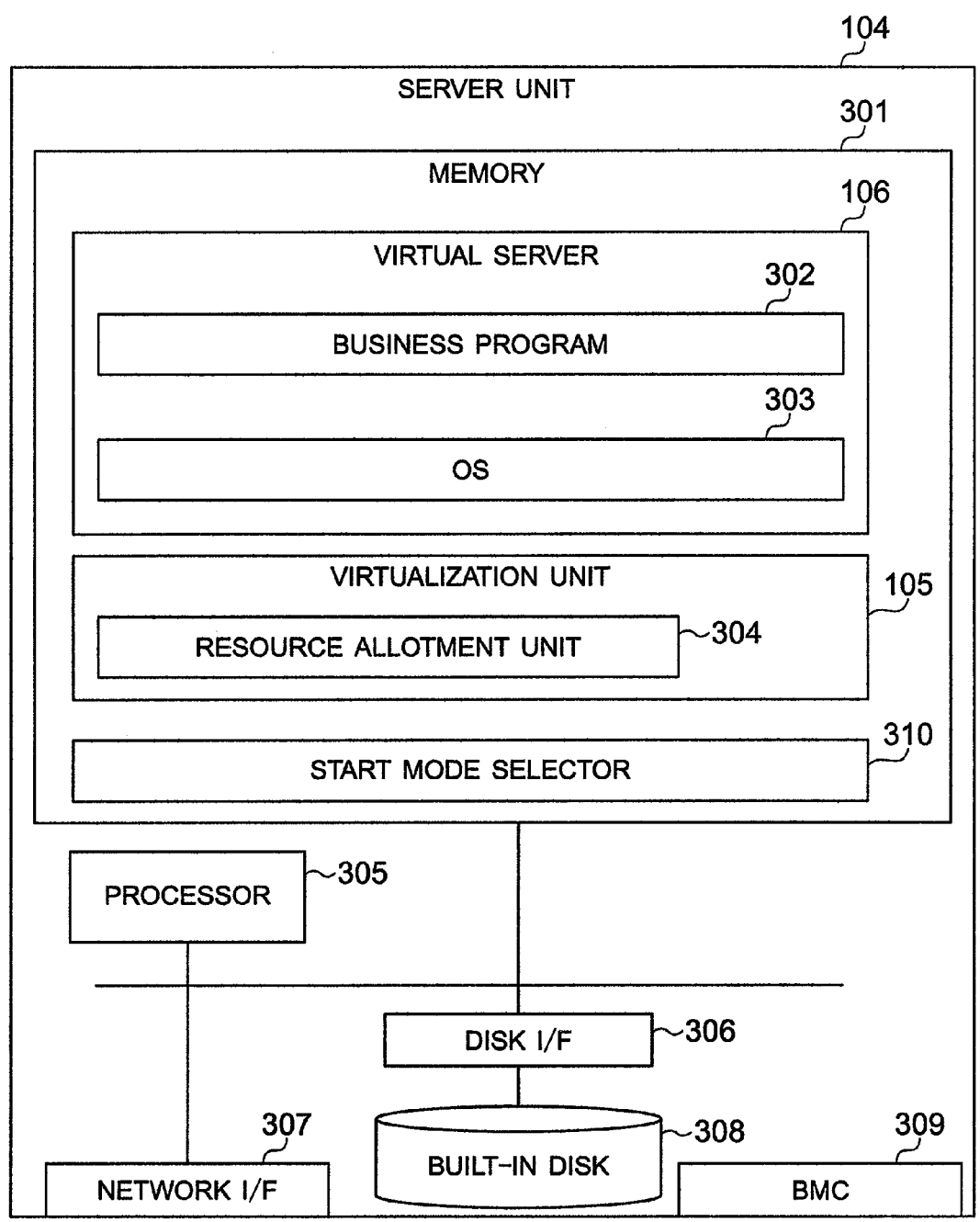
FIG. 3 is a diagram showing an example of the configuration of the server unit.

FIG. 3 is a diagram showing an example configuration of each server unit 104. The server unit 104 is configured of a memory 301, a processor 305, a network interface 307, a disk interface 306, a built-in disk 308 and a BMC (base board management controller) 309. The BMC 309 is connected to the SVP 107 to transfer the configuration information and to notify a fault. Incidentally, the BMC 309 can be operated independently of the processor 305, and even in the case where the processor 305 develops a fault and becomes inoperative, can notify the fault to the SVP 107. The BMC 309 can manage the power supply in accordance with an external request. Also, the BMC 309 has the function of checking for a fault by monitoring the signals of a temperature sensor and a voltage sensor arranged in the server unit 104, and responding to an external inquiry about the presence or the absence of a fault. Incidentally, the BMC 309 is supplied with power from an auxiliary power supply, not shown, different from the power supply for the server units 104, and therefore can function normally even in the case where the server units 104 is powered off. Also, the server unit 104 may include a plurality of network I/Fs 307, disk I/Fs and built-in disks 308.

The memory 301 stores an OS 303, a business program 302, a virtualization unit 105, a virtual server 106 and a start mode selector 310, all of which are executed by the processor 305. The start mode selector 310 selects the start mode by receiving an instruction from the management server as to whether the virtualization unit is started or not.

The various programs including the virtualization unit 105, the resource allotment unit 304 and the start mode selector 310 stored in the memory 301 are executed by the processor 305 thereby to execute various processes such as virtualization, resource allotment and start mode selection. These processes can be realized also in hardware using an integrated circuit as a processor for executing the processes.

The built-in disk 308 is connected to the processor 305 through the disk I/F 306 to store the OS 303 and the business program 302, and transferred to the memory 301 or the virtual server 106 at the time of starting the server unit 104. In the deploy operation according to this embodiment, the OS 303 and the business program 302 are copied to the built-in disk 308 from the management server 102 thereby to control the OS 303 and the business program 308 to operate normally.

The virtualization unit 105 includes the resource allotment unit 304 and manages the resources allotted to the virtual server 106. The virtual server 106 exists only during the start operation of the virtualization unit 105, and includes the OS 303 and the business program 302. A plurality of the virtual servers 106 may be formed by the virtualization unit 105. The OS 303 can operate independently for each virtual server 106. Incidentally, in the case where the server unit 104 is started without using the virtualization unit 105, the OS 303 and the business program 302 are transferred from the built-in disk 308 to the memory 301.

Figure 4:
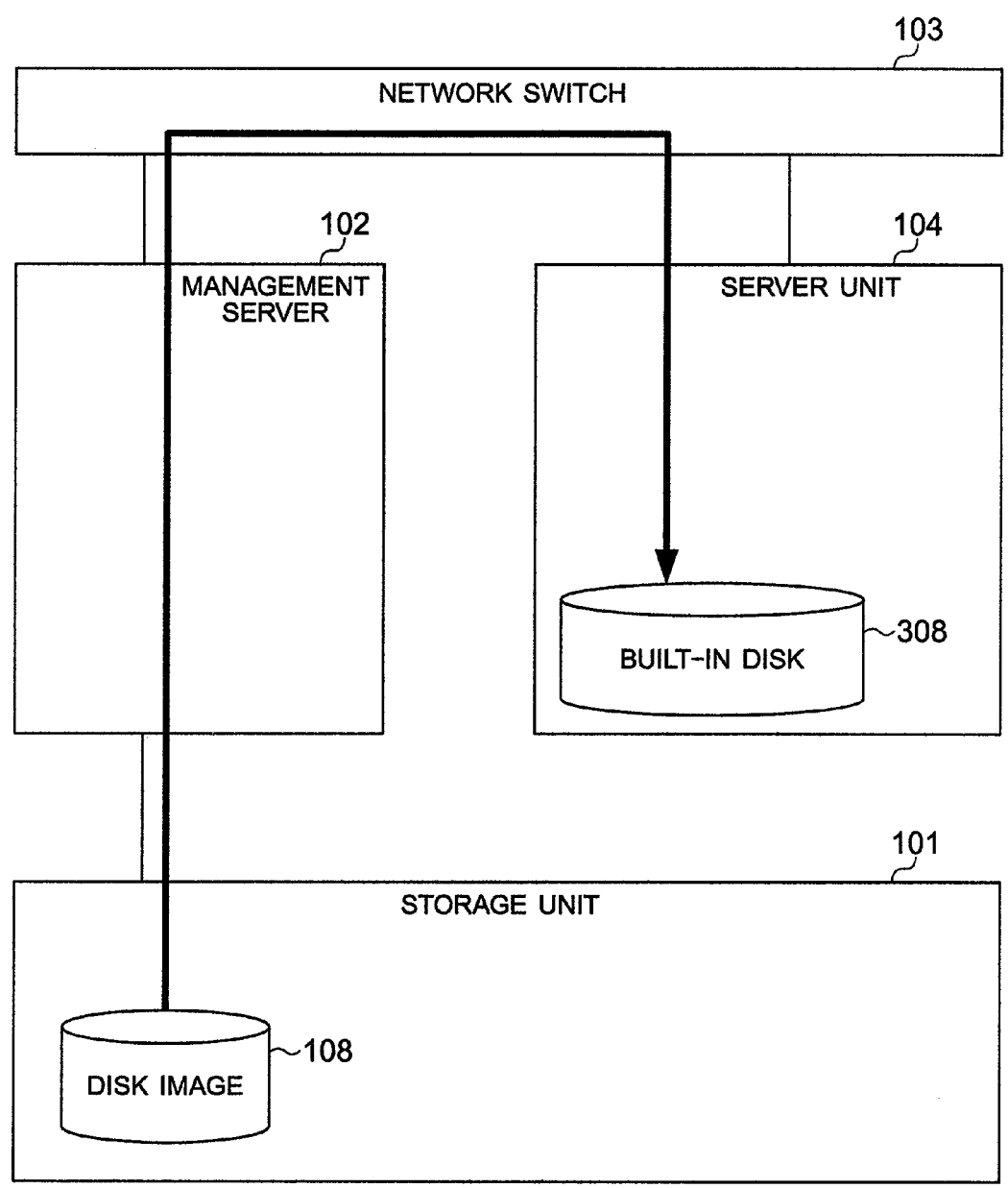
FIG. 4 is a schematic diagram showing an exemplary case in which the image is deployed to a physical server unit.

An example of the general deploy operation is shown in FIG. 4, which represents a case in which the deployee server unit 104T can be used as it is for deployment as a physical server such as a case in which the hardware configuration of the backup server unit 104F of the disk image 108 and that of the deployee server unit 104 are identical with each other. In such a case, the management server 102 deploys the disk image 108 in the storage unit 101 to the built-in disk 308 of the deployee server unit 104T through the network switch 103. After that, the deployee server unit 104T is activated as a physical server without activating the virtualization unit 105.

Incidentally, neither the OS 303 nor the software that can operate exist in the server unit 104 at the time of deployment. At the time of copying the contents of the disk image 108 from the management server 102 to the built-in disk 308, therefore, the backup/deployment agent 205 is transferred from the management server 102 to the server unit 104 before starting the deployment process. The contents of the disk image 108 received from the management server 102 are written into the built-in disk 308 by the backup/deployment agent 205. As an alternative method, the virtualization unit 105 may have the function of the backup deployment agent 205 to read the data of the disk image 108 through the network switch 103 and write it in the built-in disk 308 of the server unit 104.

Figure 5:
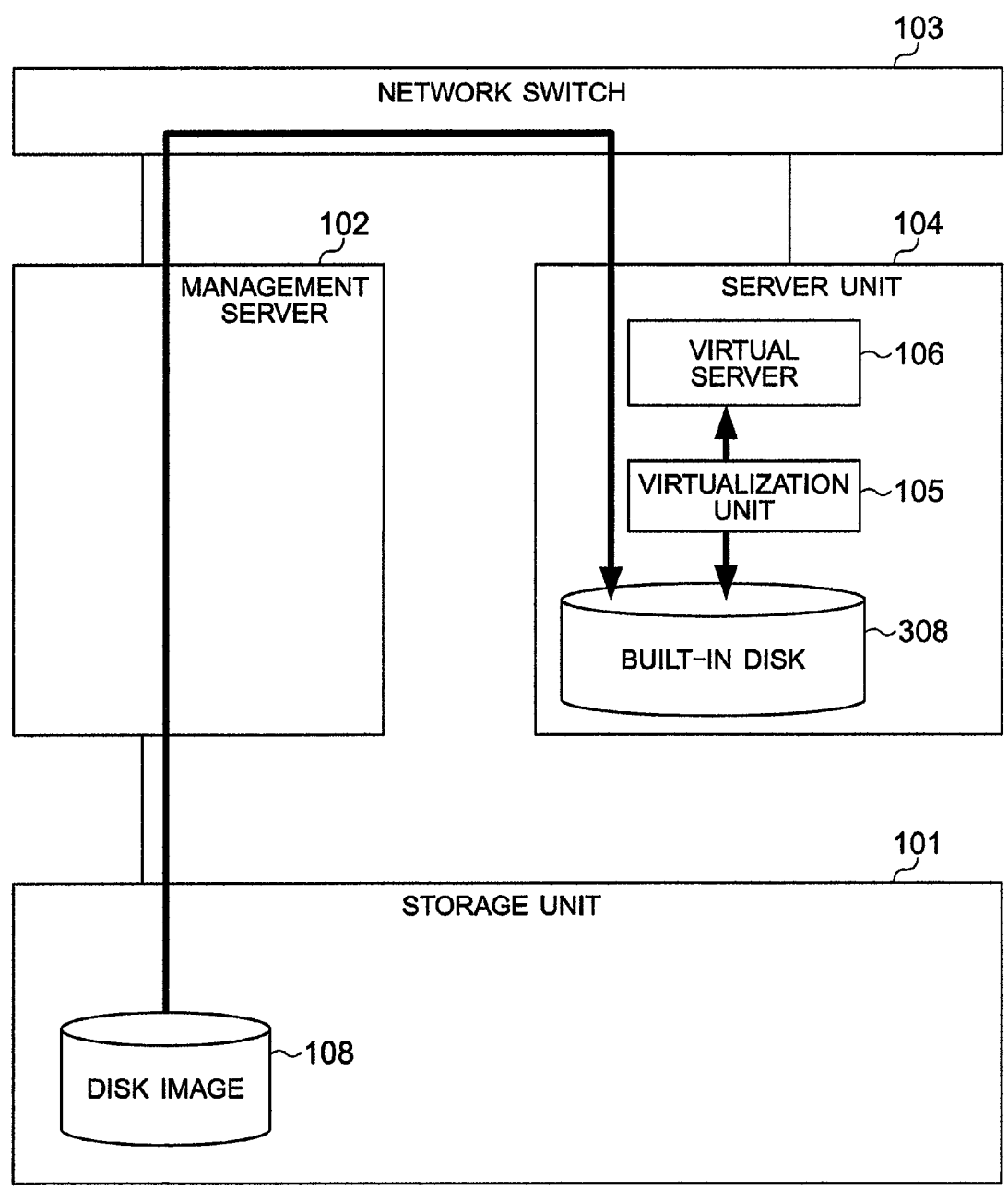
FIG. 5 is a schematic diagram showing an exemplary case in which the image is deployed to a virtual server unit.

An example of the general deploy operation according to this invention is shown in FIG. 5, which represents a case in which the backup server unit 104F for the disk image 108 is different from the deployee server unit 104T in hardware configuration, for example, and the requirement cannot be met by the reconfiguration of the disk image 108, i.e. a case in which the virtual server 106 is generated on the deployee server unit 104T and used for the intended deployment.

The virtual server 106 is a logical hardware unit allotted the CPU time and memory from the virtualization unit 105, and a virtual device emulating a physical device as viewed from the OS. Therefore, the virtual server 106 is recognized as a server unit having the physical hardware from both the OS on the virtual server 106 and the outside of the virtual server 106. As a result, the deployment to the virtual server 106 can be carried out by the same process as the deployment to the physical server unit.

At the time of input to or output from the device, the virtualization unit 105 is interposed between the virtual server 106 and the real device of the server unit 104 and the input/output to and from them are converted. The virtual device is an emulation of the physical device as viewed from the OS by this input/output conversion. Specifically, the input from the real device of the server unit 104 is converted by the virtualization device 105 into the information processable in the virtual device allotted to the virtual server 106 and input to the virtual server 106. Also, the output from the virtual server 106 is converted by the virtualization unit 105 into the information processable by the real device of the server unit 104 and output to the real device of the server unit 104. By changing the conversion method, the virtualization unit 105 can emulate various types of physical devices and allot the virtual device emulated as an arbitrary number of devices to the virtual server.

According to the prior art, in the case where the backup server unit 104F and the deployee server unit 104T are different in hardware configuration from each other, the deployment cannot be carried out. According to this embodiment, in contrast, the deployment can be carried out by the management server 102 deploying the image in the disk image 108 of the storage unit 101 to the virtual server 106 on the deployee server unit 104T. After deployment, the virtual server 106 is reactivated, so that the OS 303 and the business program 302 that have thus far been installed in the backup server unit 104F of the disk image 108 is reproduced on the virtual server 106.

As a result, even in the case where the hardware configuration of the server unit 104 at the time of generating the disk image 108 and that of the server unit 104 at the time of deployment are different from each other, the normal operation can be performed. The difference in hardware configuration is defined as the difference, for example, of the type or the number between the network interface 307 or the disk interface 306. In this way, according to an embodiment of the invention, the difference in hardware configuration that cannot be absorbed by software alone is absorbed by emulation or resource allotment of the virtualization unit 105 and using the virtual server 106 as a deployee, thereby making the normal operation possible.

Incidentally, the use of the virtual server requires the input/output conversion by the virtualization unit 105, which imposes a load on the CPU 305 and generates an overhead of the process. In the case where the hardware configuration is the same or the difference device is within the tolerance described in the tolerance list, therefore, the virtual server is not used. According to this embodiment, the judgment as to whether the virtual server is to be used or not makes possible the deployment from the disk image as far as possible to maintain the performance. Otherwise, the use of the virtual server can improve the availability.

Figure 6:
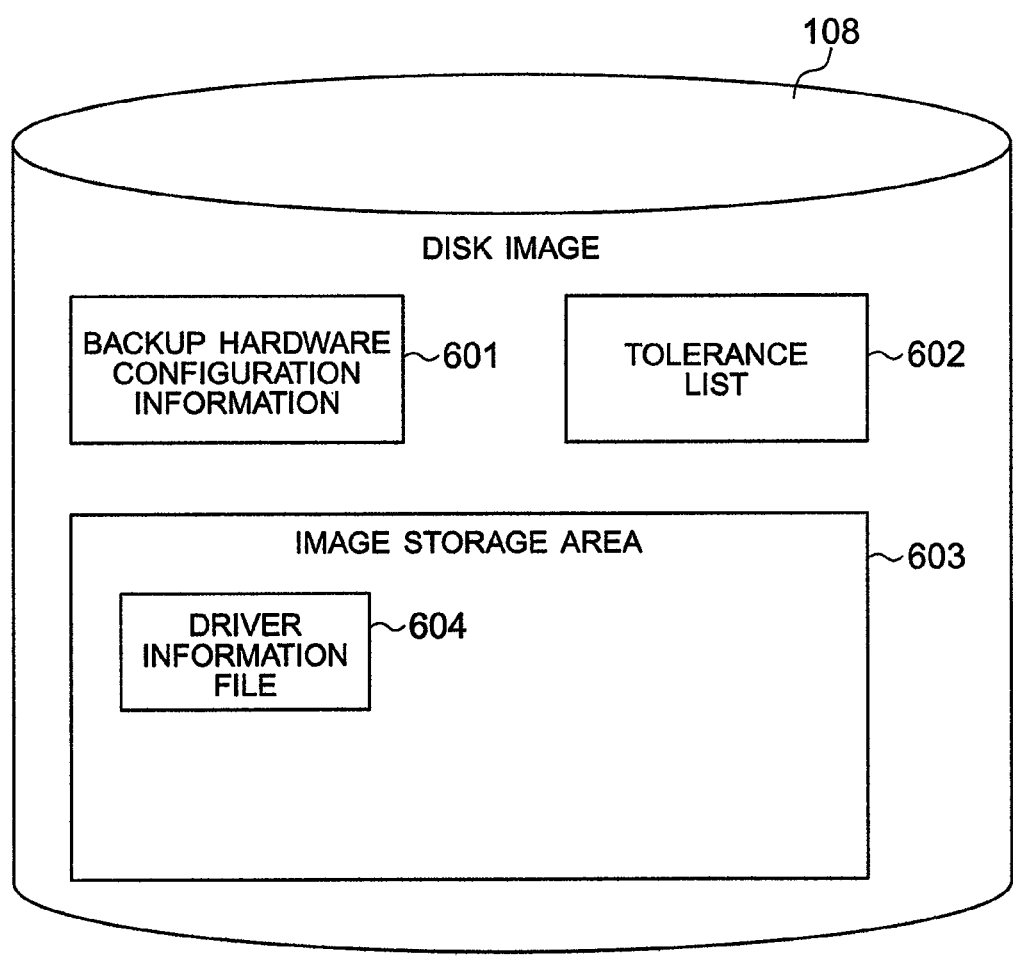
FIG. 6 is a diagram showing an example of the configuration of a disk image.

FIG. 6 shows an example configuration of the disk image 108. The disk image 108 is configured of an image storage area 603, backup hardware configuration information 601 and a tolerance list 602. The image storage area 603 has stored therein an image of the data of the built-in disk 308 connected to the backup server unit 104F. The image storage area 603 contains therein a driver information file 604. The driver information file 604 has stored therein the information on the device driver included in the disk image 108.

The driver information file 604 contains the description of the information on the device type corresponding to the driver, the information on the device corresponding to the particular driver and the device name. Each driver acquires the identifier of the corresponding device and the information on the type of the particular device by accessing the driver information file 604. The information on the device type is, for example, "NIC" or "HAB".

By holding the hardware configuration information 601 of the backup server unit 104F in the disk image 108, the disk image 108 constituting the backup source can be deployed by being moved to the management server of the data center at a different site.

Incidentally, this embodiment is applicable not only to the backup operation but also to a large scale-out at a data center, for example, in which the disk image of a given server unit 104 is stored in the storage unit 101 and deployed en masse to a plurality of deployee servers 104T. In such a case, the hardware configuration information 601 of the image acquiring server unit 104F is held in the disk image 108, and by comparing the hardware configuration 601 with the hardware configuration of the plurality of the deployee server units 104T, the possibility of deployment is judged.

In view of the fact that the disk image 108 holds therein the hardware configuration information 601 of the image acquiring server unit 104F at the time of disk image generation, a subsequent change, if any, in the hardware configuration of the image acquiring server unit 104F need not be taken into consideration.

The disk image 108 normally includes only the image storage area 603. According to this embodiment, however, the backup hardware configuration information 601 and the tolerance list 602 are stored in correspondence with each other in the image storage area 603. The use of these information makes it possible to acquire the information necessary for deployment with the disk image 108 alone even in the case where the management server 102 is changed. Also, the movement of the disk image 108 to another management server 102 is facilitated. Incidentally, in the deployment to the server unit 104, only the image storage area 603 of the disk image 108 is retrieved and transferred to the server unit 104.

Incidentally, the backup hardware configuration information 601 and the tolerance list 602 may alternatively be included in the management server. In such a case, the backup hardware configuration information 601 and the tolerance list 602 are stored on the memory or the storage unit of the management server. These information are set in correspondence with the disk image 108 stored in another place.

FIG. 7 shows an example of the server management table 111. The column 701 shows the identifiers of the physical servers, in which the identifier is allotted to each sever unit 104. The column 702 shows the information on the CPU mounted on the server unit 104, and the column 703 the information on the memory capacity. The column 704 shows the names of the devices mounted on the server unit 104 and a unique identifier, if any, of each device.

Some examples of the identifier unique to the device include MAC (media access control) address of NIC and WWN (world wide name) of HBA. The column 705 has stored therein the information on the disk connected to the server unit 104, and the column 706 the information as to whether the virtualization unit 105 of the server unit 104 is activated or not. The information stored in the column 706 include the state in which the virtualization unit 105 is not activated and the state in which the virtualization unit 105 is activated. At the time point when new server information is added to the server management table, the state in which the virtualization unit 105 is not activated is recorded as the information in the column 706. The column 707 has stored therein the information on the functions of the devices described in the column 704.

The provision of the server unit management table 111 makes it possible to acquire the hardware configuration information of the deployee server unit 104T from the server management table 111 at the time of deployment when the image deployment unit 202 compares the hardware configuration information of the backup server unit 104F with that of the deployee server unit 104T. Also, the management server 102 acquires, by way of the configuration information acquisition unit 206, the hardware configuration information of the server unit 104 connected through the network switch 103 and thus can correctly hold and manage the hardware configuration information updated whenever required.

FIG. 8 shows an example of the virtual server management table 113. The column 801 has stored therein the virtualization identifiers, wherein an identifier is allotted to each virtualization unit 105. The column 802 has stored therein the identifiers of the working physical servers, wherein an identifier is allotted to each server unit 104. The column 803 has stored therein the virtual server identifiers which are allotted to the virtual servers 106 to become unique on the same virtualization unit 105. The column 804 has stored therein the information on the resources allotted to the virtual servers 106.

The information on specific resources stored include the number and capacity of the virtualized CPU, the memory, NIC, HBA and disk unit. The management server 102 provided with the virtual server management server 113 can manage the information on the virtual server 106 on each server unit 104 connected through the network switch 103. Also, a plurality of server units 104 can be managed, and therefore, the virtual servers of the whole system can be kept in control. Incidentally, a plurality of virtual server identifiers 803 can be allotted for the virtualization mechanism identifier 801.

FIG. 9 shows an example of the deployed image management table 112. The deployed image management table 112 has stored therein the information on the disk images 108 included in the storage unit 101. The column 901 stores the image identifiers. The column 902 stores the OS type information of the images. The column 903 stores the identifiers of the backup server units. The column 904 stores the date/hour when each image is generated. The storage area of each disk image stored in the storage unit 101 corresponds to each image identifier 901 stored in the deployed image management table 112. The provision of the deployed image management table 112 permits the user giving a deployment instruction, the image deployment unit 202 and the backup/deployment agent 205 to uniquely designate the disk image 108.

By searching the deployed image management table 112 with the desired OS type as a key, the image identifier 901 having the desirably deployed OS can be identified in reverse order. Aa a result, the range of utilization of the disk images 108 held by the management server 102 can be widened. Even in the case where the manager is changed, for example, the disk images 108 can be managed by searching the management information with the OS type shared by the managers as a key without regard to the image identifiers 901 providing the information capable of being uniquely set by the manager.

FIG. 10 shows an example of the driver management table 114 for managing the drivers stored in the driver disk 109. The column 1001 shows the driver identifiers. The column 1002 shows the OS types corresponding to the respective drivers. The column 1003 stores the identifier information of the device applicable to each driver. Examples of the information thus stored include NIC1 and NIC2. The column 1004 stores the information on the function of each device corresponding to a particular driver. For example, NIC1 has the teaming and VLAN functions, and NIC2 the teaming function.

VLAN makes up a virtual network separate from a physical connection and forms the terminals into groups. Depending on the functions of the network devices such as the switch, the terminals are grouped by MAC address, IP address or protocol. The port base VLAN, the tag VLAN and the protocol VLAN are some examples.

The teaming is for distributing the network traffic load among a plurality of NICs connected to improve the network performance. Also, since the protection against a fail-over is secured, a disservice due to a network fault can be avoided for an improved availability. In one teaming configuration, two or more NICs are used, of which one is kept as a standby to replace the other which may fail. In another configuration, both NICs are kept in receive operation with one of them in transmit operation, and in the process, the NICs are recognized by the OS as a single NIC. Still another configuration uses two NICs both in transmit and receive operation, which NICs are recognized as a single NIC by the OS. The same is applicable to more than two NICs.

The N-port virtualization is the function with which a plurality of WWNs can be used for one fiber channel HBA port. By utilizing this function, LUN (logical unit number) can be allotted to more virtual servers than the HBA ports.

The information on these functions are stored in the column 1004 based on the function information acquired by the management server from the driver information corresponding to the drivers stored in the driver disk. Also, the management server, through the internet, can acquire the information on the driver designated by the driver identifier and store it in the column 1004. Also, the user may register by manual input. The storage area of each device driver of the driver disk 109 is stored in correspondence with each driver identifier 1001 of the driver management table 114. The provision of the driver management table 114 makes it possible to manage the device drivers stored in the driver disk 109.

The information stored in the function 1004 is used to change the deployment means in the case where the hardware configuration of the deployee server unit 104 is different. To change the deployment means is to change a means, for example, whether the requirement can be met simply by changing the driver or the device emulation is necessary using the virtualization unit 105. The same NIC may lack the required function if different in maker or type. In such a case, the driver management table 114 is used so that the function difference can be known in advance.

FIG. 11 shows an example of the tolerance list 602. The column 1101 shows the type of the device mounted on the backup server unit. Specifically, such information as "NIC" or "HBA" is stored. The column 1102 stores the identifiers of the devices tolerated to be mounted on the deployee server unit 104. The column 1103 stores the performance value of the performance which may be held by a device. The speed of NIC or HBA is an example of the performance. The column 1104 stores the information on the functions held by the devices of the column 1102. The LUN masking is the function of determining HBA to which each LUN is to be allotted for use. Incidentally, in the case where the LUN masking is used, only the HBA allotted can access the LUN. The "FC-TAPE compatible" indicates that the fiber channel table device can be used.

The column 1105 stores the information on the storage area of the driver and the name of the driver corresponding to each device described in the column 1102. The driver storage area may be stored as the pass information to the driver or in correspondence with the driver management table 114.

The provision of the tolerance list 602 makes it possible to judge whether the deployment to the deployee server unit 104 is possible or not without generating the virtual server 106 in the case where the backup server unit 104F and the deployee server unit are different from each other in hardware configuration. Also, the judgment is possible as to whether the reconstruction of the images in the disk images 108 using the device driver in the driver disk 109 is required or not in the case where the virtual sever 106 is not generated.

FIG. 12 shows an example of the backup hardware configuration information 601. The column 1201 stores the server identifiers of the backup server unit 104F. The column 1202 stores the CPU information of the backup server unit 104F. The column 1203 stores the memory information. The column 1204 stores the information on the mounted devices. The column 1205 stores the device performance values. The column 1206 stores the information on the partition configuration. The column 1207 stores the information on the function of the devices mounted on the backup server unit 104F. The provision of the backup hardware configuration information 601 makes it possible to compare the hardware configuration of the backup server unit 104F with the hardware configuration information of the deployee server unit 104T at the time of backup operation. Incidentally, the backup server may be called the deployer server or the image acquiring server.

Figure 13:
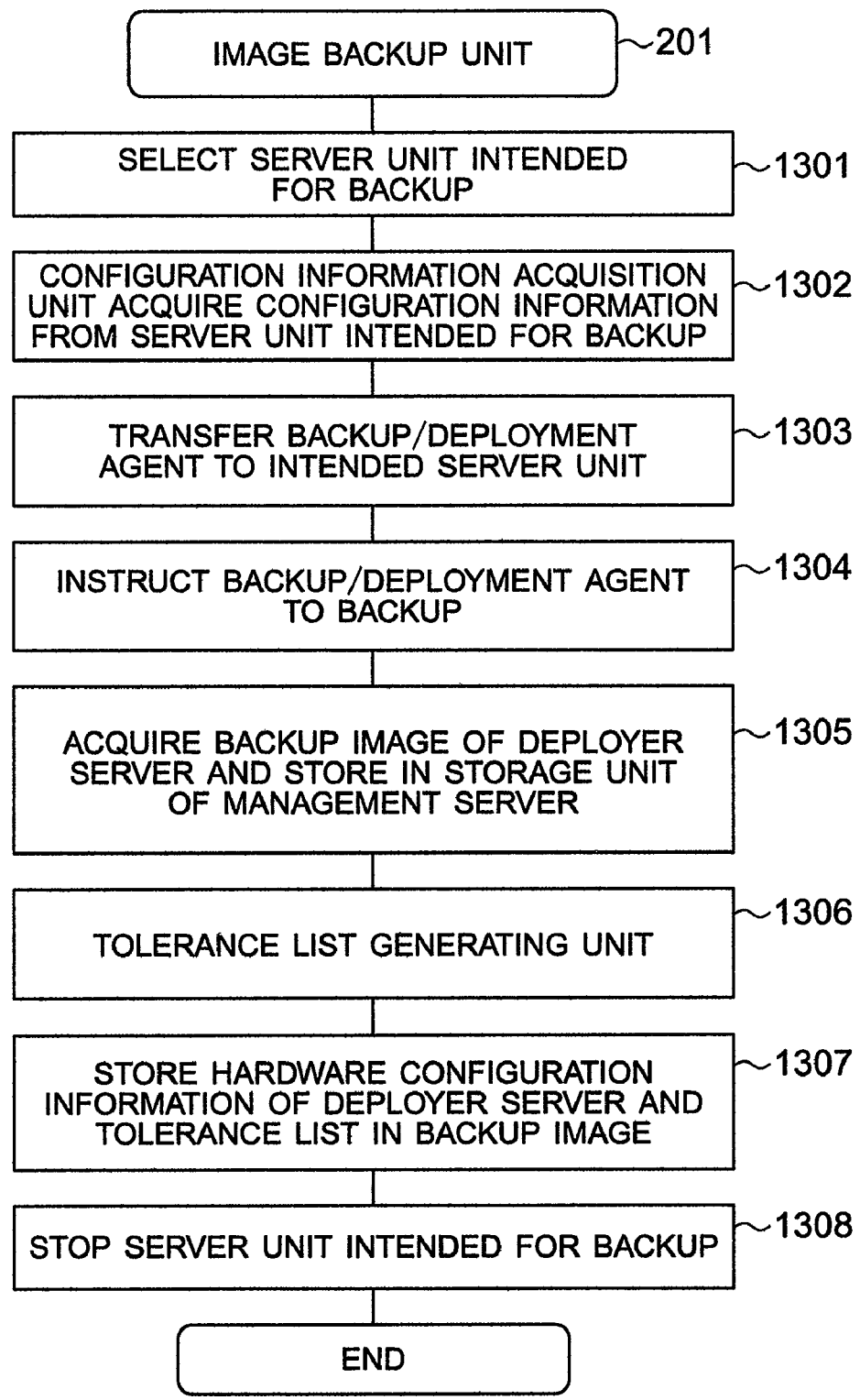
FIG. 13 shows an example of a flowchart for an image backup unit.

FIG. 13 shows an example of the processing flow for the image backup unit 201. The image backup unit 201 receives the selection of the server unit intended for backup from the user (step 1301). The configuration information acquisition unit acquires the hardware configuration information from the server unit 104 intended for backup. The configuration information thus acquired is stored in the backup hardware configuration information 601 (step 1302). The image backup unit 201 transfers the backup/deployment agent 205 to the backup sever unit 104F (step 1303). The backup/deployment agent 205 operates on the backup server unit 104F and performs the jobs of image generation and transfer of the generated image to the image backup unit 201.

The backup/deployment agent 205 acquires the driver information of the device of the backup server and transfers it, together with the disk image generated, to the image backup unit 201. As an alternative, the driver information is included in the disk image generated, and transferred to the image backup unit 201.

The image backup unit 201 gives a backup instruction to the backup/deployment agent 205 (step 1304). The image backup unit 201 acquires the backup image of the backup server from the backup/deployment agent 205 and stores it in the storage unit of the management server. In the process, the information on the particular backup image is stored in the deployed image management table 112. The OS information in the column 902 is used, if acquired by the backup/deployment agent 205. Otherwise, the information is acquired by user input. The backup server identifiers in the column 903 are recorded based on the designation of the backup server unit from the user in step 1301. Also, the backup date/hour is recorded in the column 904 (step 1305). The tolerance list generating unit generates the tolerance list 602 listing the devices tolerated for the deployee server (step 1306).

The image backup unit 201 stores in the disk images 108 the tolerance list 602 generated in step 1306 and the backup hardware information 601 generated in step 1302 (step 1307). The disk images 108 store the driver information of the backup server as the driver information file 604. The image backup unit 201 stops the server unit intended for backup (step 1308). In this flow, the image of the disk of the backup server unit 104F is generated, thereby making it possible to store in the disk images 108 the hardware configuration information of the backup server unit 104F and the tolerance list 206 of the device mounted at the deployee.

Figure 14:
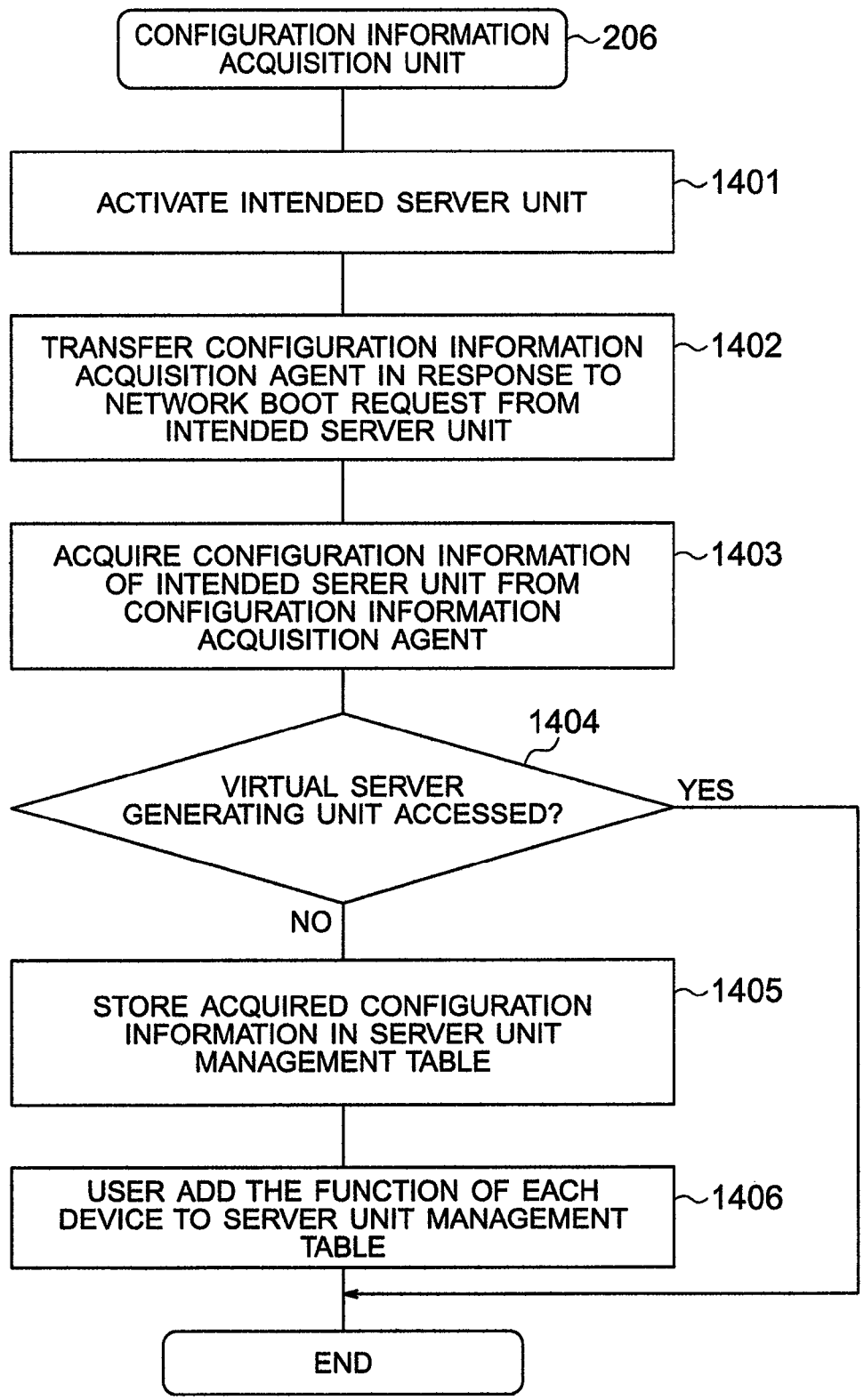
FIG. 14 shows an example of a flowchart for a configuration information acquisition unit.

FIG. 14 shows an example of the processing flow for the configuration information acquisition unit 206. The configuration information acquisition unit 206 activates the server unit 104 intended to acquire the configuration information from (step 1401). The configuration information acquisition unit 206 responds to the network boot request from the intended server unit 104 and transfers the configuration information acquisition agent 208 to the intended server unit 104 (step 1402). The configuration information acquisition unit 206 acquires the hardware configuration information of the intended server unit 104 from the configuration information acquisition agent 208 (step 1403). The configuration information acquisition unit 206 judges whether it is accessed from the virtual server generating unit or not (step 1401). In the case where the configuration information acquisition unit 206 is accessed from the virtual server generating unit, the configuration information acquisition unit is terminated. Otherwise, the process proceeds to step 1405. The hardware configuration information acquired in step 1403 is stored by the configuration information acquisition unit 206 in the server unit management table 111 (step 1405). The user inputs the functions of each device as required, and the configuration information acquisition unit 206 adds the particular information to the column 707 associated with the intended server unit of the server unit management table 111 (step 1406).

By executing this processing flow, the hardware configuration information of the server unit 104 and the functions of the mounted device can be stored in the server unit management table 111.

Also, in the case where the configuration information acquisition unit 206 is accessed by the image backup unit 201, the hardware configuration information of the backup server unit F104 acquired by a similar process can be stored in the backup hardware configuration information 601.

As a result, the management server 102 can manage the hardware information of all the server units 104 connected through the network switch 103.

Figure 15:
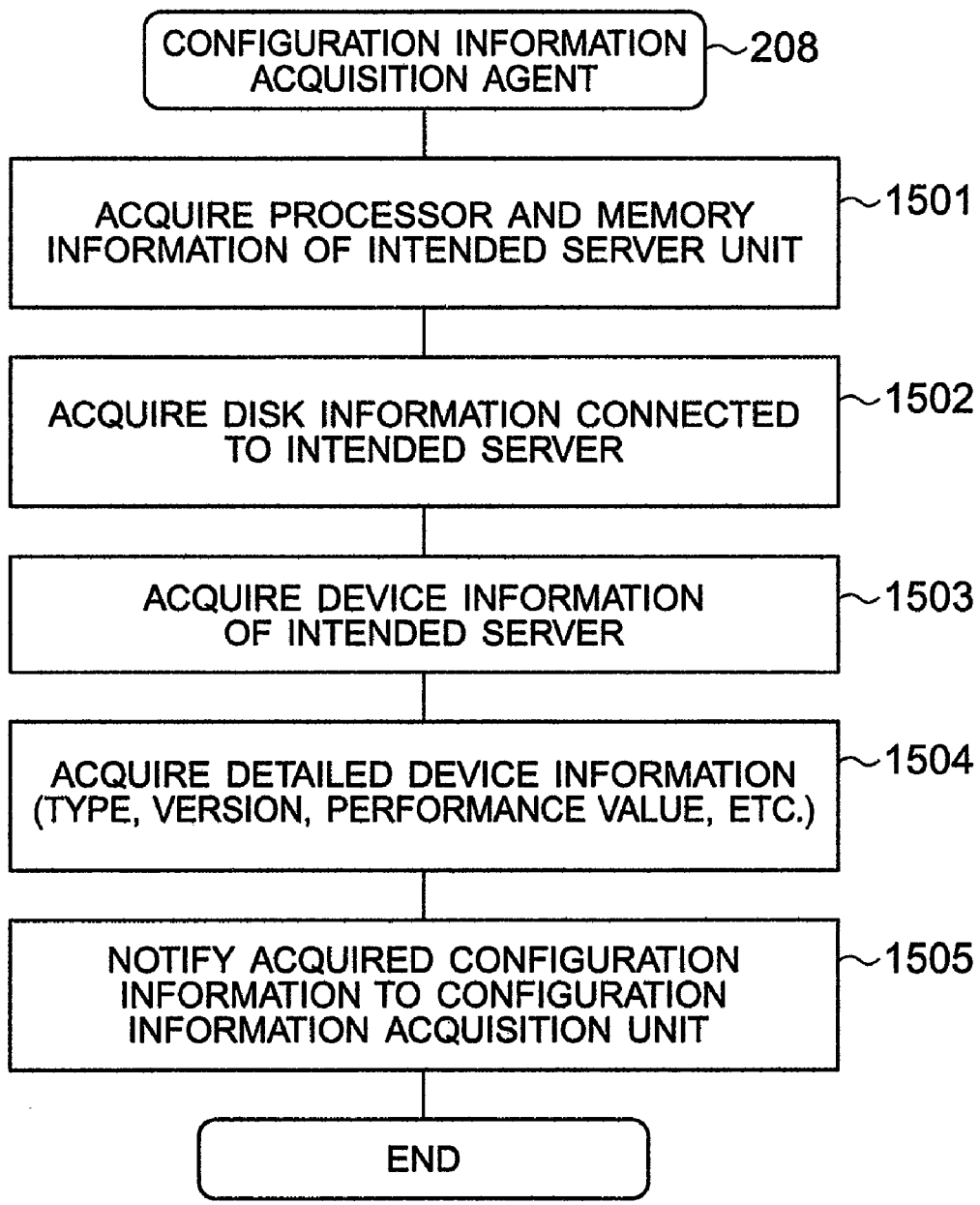
FIG. 15 shows an example of a flowchart for a configuration information acquisition agent.

FIG. 15 shows an example of the flow of the process executed by the configuration information acquisition agent 208. The configuration information acquisition agent 208 acquires the information of the processor 305 and the memory 301 of the intended server unit 104 intended to acquire the hardware configuration information from (step 1501). The configuration information acquisition agent 208 acquires the information of the disk 308 connected to the intended server unit 104 (step 1502). The configuration information acquisition agent 208 acquires the information of the device mounted on the intended server unit 104 (step 1503). The configuration information acquisition agent 208 acquires the detailed information of each device (step 1504). The detailed information include the name, the version and the performance. The hardware configuration information of the intended server unit 104 acquired by the configuration information acquisition agent 208 is notified to the configuration information acquisition unit 206 (step 1505). By executing this process flow, the job of actually acquiring the information is performed on the server unit 104 to acquire the hardware configuration information from.

Figure 16:
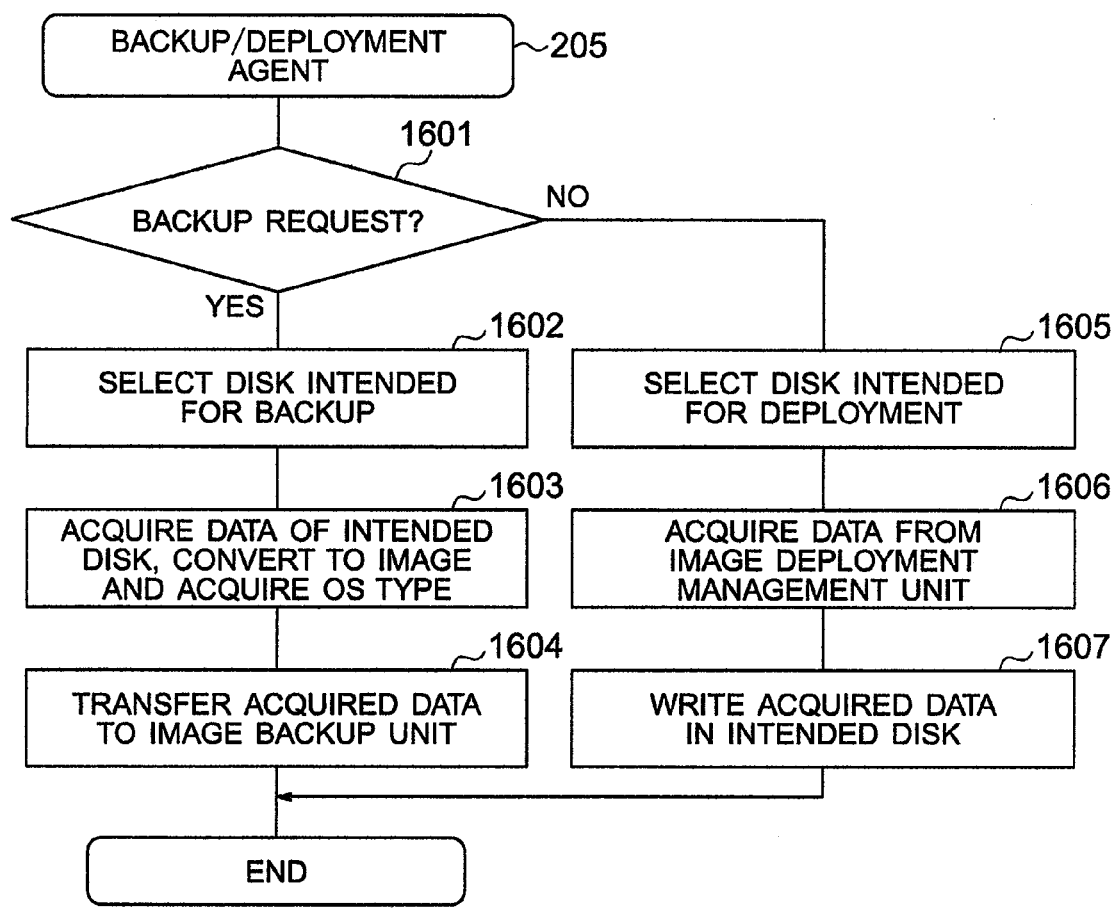
FIG. 16 shows an example of a flowchart for a backup deployment agent.

FIG. 16 shows an example of the process flow of the backup/deployment agent 205. The backup/deployment agent 205 judges whether the request to the backup/deployment agent 205 is the backup or not (step 1601). In the case where the request is the backup, i.e. in the case where the backup/deployment agent 205 is accessed from the image backup unit 201, the process proceeds to step 1602. In response to the instruction from the management server 102, the backup/deployment agent 205 selects the disk intended for backup (step 1602). The backup/deployment agent 205 acquires the data of the intended disk, and by imaging it, acquires the type of OS, if possible (step 1603). The backup/deployment agent 205 transfers the data acquired in step 1603 to the image backup unit 201 (step 1604).

In the case where the request is not the backup in step 1601, i.e. in the case where the backup/deployment agent 205 is accessed from the image deployment unit, on the other hand, the process proceeds to step 1605. The backup/deployment agent 205 selects the disk intended for deployment (step 1605). In accordance with the instruction of the deployment management unit 110, the backup/deployment agent 205 selects the disk image 108 in the storage unit 101 and acquires the data of the image included therein (step 1606). The backup/deployment agent 205 writes the image acquired in step 1606 in the disk intended for deployment (step 1607). By execution of this process flow, the actual job of backup or deployment on the server unit 104 intended for backup or deployment, as the case may be, is carried out.

Figure 17:
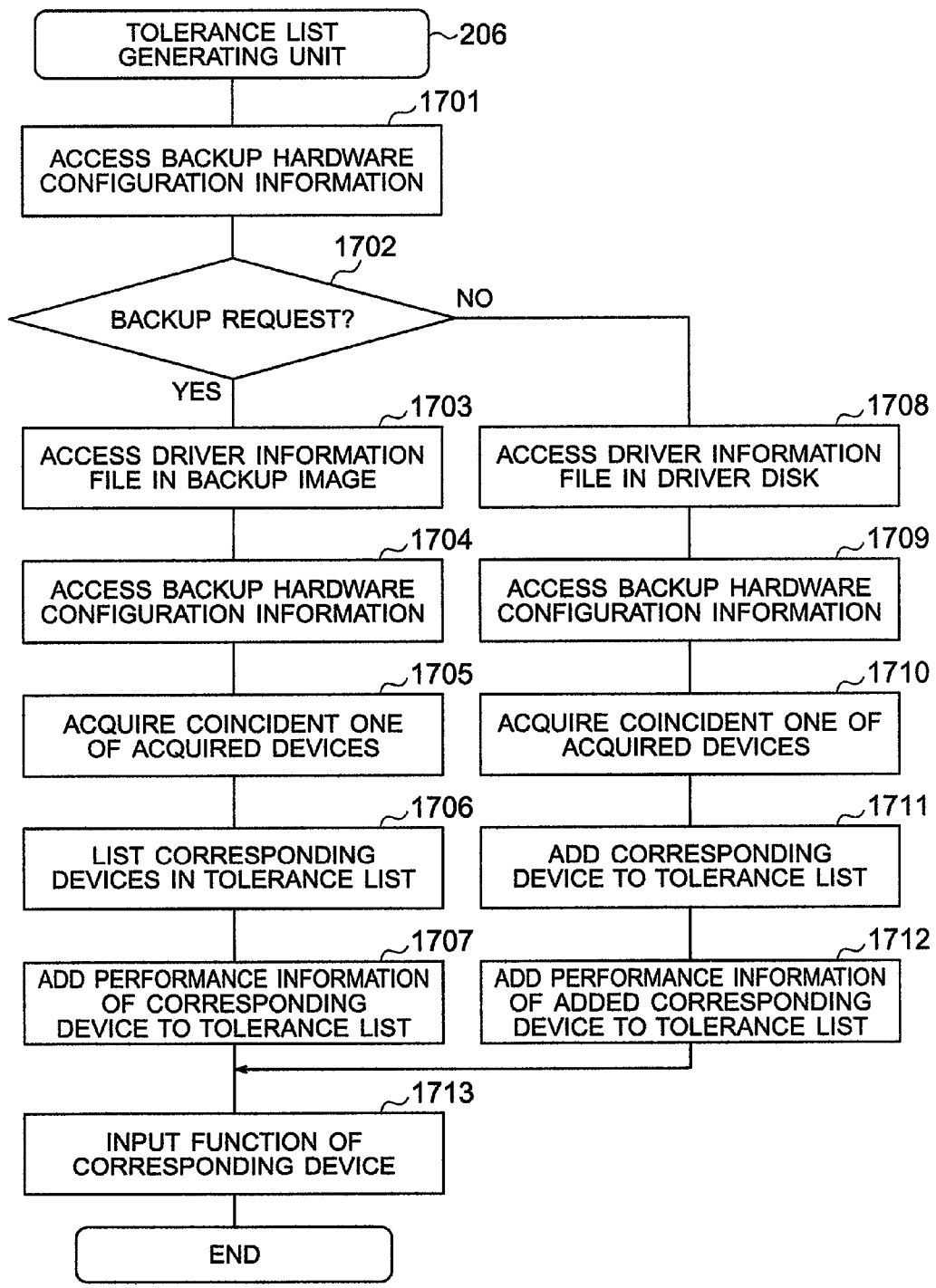
FIG. 17 shows an example of a flowchart for a tolerance list generating unit.

FIG. 17 shows an example of the process flow of the tolerance list generating unit 204. The tolerance list 602 exists for each disk image of the deployment image management table 112. The tolerance list 602 is stored in correspondence with the backup hardware configuration information 601 and the image storage area 603. The tolerance list generating unit 204 acquires the information on the type of the devices mounted on the backup server unit 104F from the column 1204 of the backup hardware configuration information 601 in the disk images 108 (step 1701). After that, the tolerance list generating unit 204 judges whether the access is made at the time of backup or deployment (step 1702).

In the case where the access is made at the time of backup, the process proceeds to step 1703. The tolerance list generating unit 204 accesses the driver information file 604 in the disk images 108 (step 1703). The driver information file 604 contains the description of the information on the type of the device corresponding to the driver, the information on the device corresponding to the particular driver and the device name. The tolerance list generating unit 204 accesses the driver information file 604 thereby to acquire the identifier of the device corresponding to each driver and the information on the type of the particular device. The information on the device type referred here is, for example, "NIC" or "HBA".

The tolerance list generating unit 204 acquires the information on the type of the device mounted on the backup server unit 104F described in the column 1204 of the backup hardware configuration information 601 (step 1704).

The information on the type of the device corresponding to the driver stored in the driver information file 604 acquired in step 1703 is compared with the information on the type of the device mounted on the backup server unit 104F acquired in step 1704, and the information on the type of the coincident device is acquired (step 1705).

After that, the information of the type of the device mounted on the backup server unit 104F acquired in step 1704 is listed in the column 1101. The list of the identifiers of the devices compatible with the drivers included in the disk images 108, i.e. the coincident devices acquired in step 1705 are stored in the column 1102 of the tolerance list 602 in correspondence with the device types in the column 1103 (step 1706).

Among the devices stored in the tolerance list 602 in step 1706 by the tolerance list generating unit 204, the performance information acquired from the driver information file 604, etc. corresponding to the devices and the performance information acquired at the time of acquiring the hardware configuration information are added to the column 1103 of the tolerance list 602 as the performance information (step 1707).

Upon judgment in step 1702 that the tolerance list generating unit 204 is accessed at the time of deployment, on the other hand, the process proceeds to step 1708. The tolerance list generating unit 204 thus accesses the driver information file 604 included in the driver disk 109, and acquires the identifier of the device corresponding to each driver and the information on the type of the particular device (step 1708).

The tolerance list generating unit 204 acquires the information on the type of the device mounted on the backup server unit 104F from the column 1204 of the backup hardware configuration information 601 (step 1709).

The information on the type of the device corresponding to the driver stored in the driver information file 604 acquired in step 1708 is compared with the information on the type of the device mounted on the backup server unit 104F acquired in step 1709, and the information on the type of the coincident device is acquired (step 1710).

In the presence of any coincident device not described in the tolerance list, the information on the type of such device is added to the column 1102 in correspondence with the type of the device in column 1101.

With regard to the added devices having the performance information known from the driver information file 604, etc., the tolerance list generating unit 204 adds the performance information to the tolerance list 602 (step 1712).

In step 1713, the information on the functions are added for the devices described in the tolerance list 602. Among these function information, the tolerance list generating unit 204 acquires the function information corresponding to the device identifiers from the device information storage unit not shown and stores them in the column 1104. Also, the tolerance list generating unit 204 can acquire, through the internet, the information on the device designated by the device identifier and store it in the column 1104. Also, the information can be manually input and registered by the user.

Assume that the information contained in the tolerance list 602 generated by this process flow is accessed. Even in the case where the backup server unit 104F and the deployee server unit 104T are different from each other in hardware configuration, the judgment is possible that the deployment can be carried out as far as the requirement is met by using the device driver in the disk image 108 or the driver disk 109.

Figure 18:
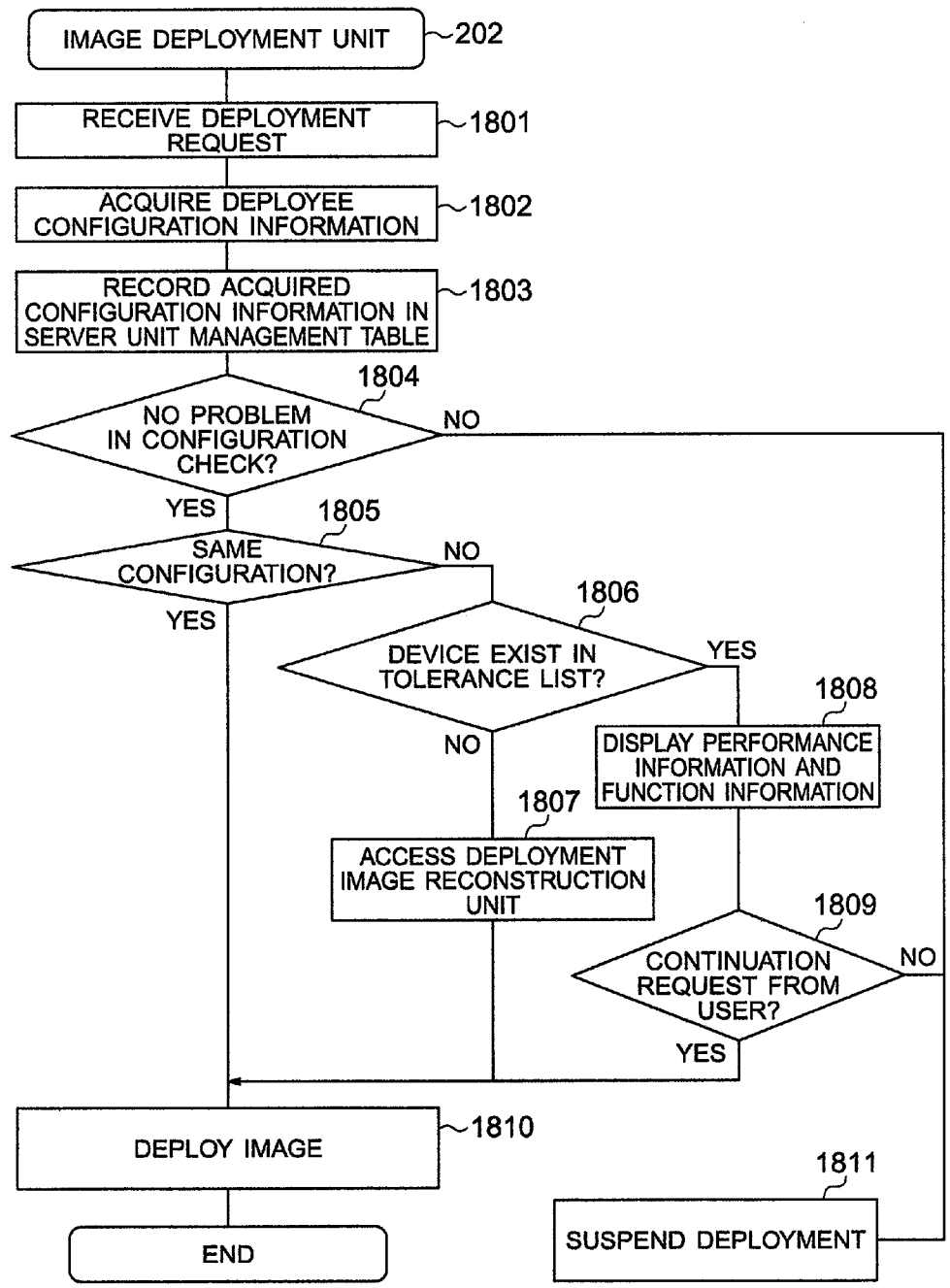
FIG. 18 shows an example of a flowchart for an image deployment unit.

FIG. 18 shows an example of the process flow for the image deployment unit 202. The image deployment unit 202 acquires from the management server the information as to which disk image 108 is deployed to which server unit 104 from the management server, and thus selects the disk image 108 used for deployment. In the process, the image is identified by reference to the image identifier of the column 901 of the deployed image management table (step 1801). The management server determines, as a disk image to be deployed, the disk image corresponding to the server unit 104 that has developed a fault, for example, based on the deployment image management table 112. Also, by presenting the information in the deployment image management table 112 to the user, the user can determine which disk image is to be deployed.

The image deployment unit 202 accesses the configuration information acquisition unit 206, and the configuration information acquisition unit 206 acquires the hardware configuration information of the deployee server unit 104T (step 1802). The hardware configuration information of the deployee server unit 104T acquired in step 1802 is recorded in the server unit management table 111 by the image deployment unit 202 (step 1803).

The image deployment unit 202 acquires the hardware configuration information of the deployee server unit 104T including the CPU information of the column 702, the information on the memory capacity of the column 703, the information on the mounted device of the column 704 and the information on the capacity of the connected disk unit of the column 705 in the server management table 111.

As the hardware configuration information of the backup server unit 104F, the CPU information of the column 1202, the memory information of the column 1203, the information on the mounted device of the column 1204 and the information on the partition configuration of the column 1206 included in the backup hardware configuration information 601 in the disk images 108 are acquired and compared (step 1804).

By acquiring the hardware configuration information of the backup server unit 104F from the disk images 108, the disk image constituting the deployment master can be deployed by being ported to the data center at another site.

Also, in the case where the hardware configuration of the backup server unit 104F is changed after generating the backup image, the deployment can be carried out by referring the hardware configuration at the time of generating the backup image. Therefore, the management server 102 can appropriately manage the server unit 104 by updating the information in the server unit management table 111.

In the case where the comparison of the hardware configurations in step 1804 shows that the deployee server unit 104T is short of the disk capacity, the required hardware is not mounted or other elements exist apparently making impossible the deployment, then the process proceeds to step 1805. In the case where the conditions apparently making impossible the deployment to the deployee server unit 104T are found inn step 1804, the process proceeds to step 1811 and the image deployment unit 202 suspends the deployment.

In step 1805, the image deployment unit 202 acquires the hardware configuration information of the backup server unit 104F from the column 1204 of the backup hardware configuration information 601 in the disk image 108, and the hardware configuration information of the deployee server unit 104T from the column 704 of the server management table 111, which information are compared with each other.

The aforementioned process judges whether the backup server unit 104F and the deployee server unit 104T have the same hardware configuration or not. In the case where step 1805 judges that the device configurations are the same, the process proceeds to step 1810. Upon judgment that the configurations are not the same in step 1805, on the other hand, the device causing the judgment that the configuration is not the same (referred to as the difference device) is specified, and the process is passed to step 1806.

Step 1809 judges whether the difference device is included in the tolerance list 602 or not by the image deployment unit 202 referring to the identifier information of the tolerable device of the column 1102 of the tolerance list 602.

In the case where the difference device is included in the tolerance list 602, the disk image 108 includes the device driver corresponding to the difference device, and therefore, the image in the disk image 108 can be deployed as it is. In the case where the difference device is not included in the tolerance list 602, on the other hand, the driver included in the disk image 108 cannot meet the requirement of the device of the deployee server unit.

In the case where step 1806 judges that the difference device is not included in the tolerance list 6021, the process proceeds to step 1807. In step 1807, the image deployment unit 202 accesses the deployed image reconstruction unit 207. The deployed image reconstruction unit 207 reconstructs the image to be deployed using the driver disk 109 or accesses the virtual server generating unit 203 to generate the virtual server in the deployee machine.

In the case where step 1806 judges that the difference device is included in the tolerance list 602, on the other hand, the process proceeds to step 1808. In step 1808, the image deployment unit 202 displays the difference device, and indicates to the user that the deployee server unit and the backup server unit have not the same hardware configuration. Also, the device configuration information of the column 1204 of the backup hardware configuration information 601, the performance value of the column 1205, the function information of the column 1207, the performance value of the column 1103 of the tolerance list 602 and the function information of the column 1104 are acquired, thereby indicating to the user the information on the performance and the function of the devices, which though of the same type, have different configurations between the backup server and the deployee server, In step 1809, the image deployment unit 202 requests the user to input as to whether the deployment is continued or not. In the case where the user desires to continue the deployment, the process proceeds to step 1810. In the case where the user desires the discontinuation of the deployment, on the other hand, the process proceeds to step 1811, and the deployment is suspended. Incidentally, a configuration may be employed in which the image is always deployed without accepting the deployment continuation request from the user. In such a case, the device performance and function information are not required to be displayed in step 1808.

In step 1810, the image deployment unit 202 transfers the backup/deployment agent 205 to the deployee server unit and carries out the actual deployment job.

The execution of this process flow makes it possible to carry out the deployment even in the case where the backup server unit 104F and the deployee server unit 104 have different hardware configurations. Also, depending on the user judgment, the deployment may be suspended.

The disk image 108 holds therein the hardware configuration information 601 of the image acquiring server unit 104F, and by comparing the hardware configuration 601 with those of a plurality of the deployee server units 104T, judgment is made as to whether the deployment is possible or not. Even in the case where there are a plurality of images to be deployed to a plurality of the deployee server units 104T such as in a large scale-out at the data center, therefore, the deployment can be carried out easily without making individual inquiries to the respective image acquiring servers.

Figure 19:
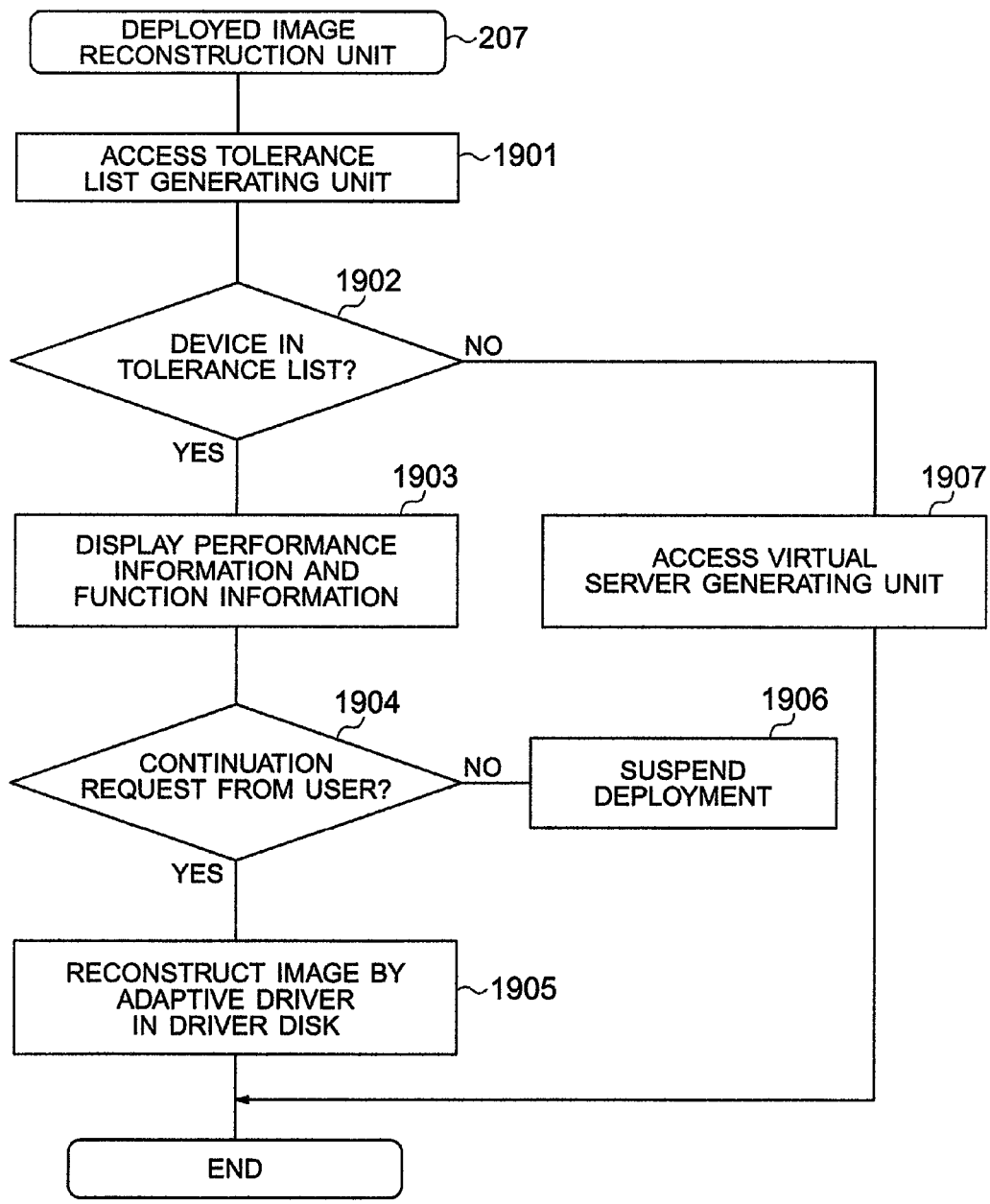
FIG. 19 shows an example of a flowchart for a deployed image reconstruction unit.

FIG. 19 shows an example of the process flow for the deployed image reconstruction unit 207. The deployed image reconstruction unit 207 accesses the tolerance list generating unit 204, which in turn updates the tolerance list 602 by referring to the driver disk 109 (step 1901). By execution of this step, the device compatible with the driver stored in the driver disk 109 may be added to the tolerance list 206. Based on the information of the driver application identifier 1003 of the driver management table 114, judgment is made whether a compatible device is available or not.

The deployment image reconstruction unit 207 acquires in step 1805 the information on the difference device causing the judgment that the configuration is different from that of the backup server unit 104F mounted on the deployee server unit 104. The deployment image reconstruction unit 207 judges whether the difference device exists in the column 1102 of the updated tolerance list 602 or not (step 1902). Upon confirmation that the difference device exists in the tolerance list 602, the process proceeds to step 1903. In such a case, the image can be deployed to the deployee server unit 104T by reconstructing the deployed image in the disk image 108 using the device driver stored in the driver disk 109.

In step 1903, the deployed image reconstruction unit 207 indicates to the user that the deployee server unit 104T is different in hardware configuration from the backup server unit 104F. Also, the device configuration information in the column 1204, the performance value of the column 1205 and the function information in the column 1207 in the backup hardware configuration information 601, and the performance value of the column 1103 and the function information of the column 1104 of the tolerance list 602 are acquired. Then, the information on the performance and function of the devices mounted on the backup server unit 104F and the deployee server unit 104T are indicated to the user.

After that, the deployment image reconstruction unit 207 requests the user to input whether the deployment is to be continued or not (step 1904). In the case where the user requests the continuation of deployment, the process proceeds to step 1905. In the case where the user requests the discontinuation of deployment, on the other hand, the process proceeds to step 1906 and suspends the deployment. Incidentally, the image may alternatively be always deployed without accepting the instruction for deployment continuation from the user. In such a case, the information on the performance and function of the device is not required to be displayed in step 1903.

In step 1905, the deployment image reconstruction unit 207 selects the appropriate device driver in the driver disk 109 with the device identifier information of the column 1102 of the tolerance list 602 as a key, and installs the selected device driver in the image storage area 603 in the disk image 108 thereby to reconstruct the image.

In the case where the backup hardware configuration information 601 in the disk image 108 has the configuration shown in FIG. 12 and the hardware configuration information of the deployee server unit 104T has the configuration similar to the configuration of the server 3 shown in FIG. 7, for example, the deployment image is reconstructed according to the flow described below. In the process, the difference in hardware configuration between the backup server unit 104F and the deployee server unit 104T lies in that NIC1 and HBA1 in the backup server unit 104F are replaced by NIC2 and HBA2, respectively. In deploying the disk image 108 to the deployee server unit 104T, therefore, the device drivers corresponding to NIC2 and HBA2 are required.

It is understood from the tolerance list 602 that the device driver corresponding to the NIC2 and the device driver corresponding to the HBA2 are existent in the driver disk. The deployed image reconstruction unit 207 installs the drivers 2 and 5 in the driver disk in the image storage area 603 in the disk image 108 thereby to reconstruct the image.

In the case where the intended device is not existent in the tolerance list 602 in step 1902, the process proceeds to step 1907. In step 1907, the deployed image reconstruction unit 207 accesses the virtual server generating unit 203. As the result of this access, either a deployable virtual server 106 is generated or the deployment is suspended by the user. By executing this process flow, the image can be deployed also to the deployee server unit 104T having the hardware configuration incapable of meeting the requirement only with the device driver in the disk image 108, as far as the requirement can be met by the device driver in the driver disk 109.

According to this embodiment, in the case where the difference device is not existent in the device tolerance list 602 in step 1806, the deployment image reconstruction unit 207 is accessed and the image reconstruction executed. Nevertheless, even in the case where the difference device is not existent in the device tolerance list 602 in step 1806, the virtual server can also be generated by accessing the virtual server generating unit 203 without accessing the deployed image reconstruction unit 207.

FIG. 20 shows an example of the process flow for the virtual sever generating unit 203. In view of the fact that the hardware configuration of the deployee server unit 104T is not the same as that of the backup server unit 104F, the virtual server generating unit 203 generates the virtual server 106 on the deployee server unit 104T and indicates a message to the user notifying that the deployment is carried out (step 2001). The virtual server generating unit 203 requests an input from the user as to whether the deployment is continued or not (step 2002).

In the case where the user requests the continuation of the deployment, the process proceeds to step 2004. In the case where the user requests the discontinuation of the deployment, on the other hand, the process proceeds to step 2003 and the deployment is suspended. Incidentally, the virtual server may alternatively be kept generated and the image deployed without accepting the deployment continuation instruction from the user. In such a case, the information on the performance and function are not required to be displayed in step 2001.

In step 2004, the virtual server generating unit 203 activates the virtualization unit 105 of the deployee server unit 104T. The virtual server generating unit 203 determines the configuration of the virtual server 106 having a deployable hardware configuration. Then, the virtual server generating unit 203 instructs the virtualization unit 105 to activate the virtual server. The deployable hardware configuration is that of the virtual server 106 having the same hardware configuration as the deployer hardware configuration information 601 or having the hardware configuration included in the tolerance list 602.

The configuration of the virtual server 106, therefore, is the same as that of the deployer hardware configuration information 601 or not different from the hardware configuration included in the tolerance list 602.

In the case where the backup hardware configuration information 601 in the disk images 108 has the configuration as shown in FIG. 12 and the deployee server unit 104T has the hardware configuration shown as the server 2 in FIG. 7, for example, the virtual server 106 is configured by the flow shown below. First, the difference in hardware configuration between the backup server unit 104F and the deployee server unit 104T is that the backup server unit 104F has one NIC1 and two HBA1s, while the deployee server unit 104T has one each of NIC3 and HBA1.

In this case, the device driver for NIC3 and one more HBA1 are required to deploy the disk images 108 to the deployee server unit 104T. Referring to the tolerance list 602, however, the device driver for NIC3 is existent neither in the disk image nor the driver disk. Also, assume that HBA1 cannot be prepared.

In the case where an instruction to continue the deployment is still given from the user, the virtual server generating unit 203 instructs the virtualization unit 105 to convert the input/output of one NIC3 and one HBA1 into one NIC3 and two HBA1s and to configure the virtual server in which one NIC3 and two HBA1s are visible from the OS on the virtual server. Also, the virtual server generating unit 203 instructs the virtualization unit 105 to allot the virtual CPU, the virtual memory and the virtual disk to the virtual server using the information in the columns 1202, 1203 and 1206 of the backup hardware configuration information 601.

The virtual server 106 is allotted the CPU time and the memory from the virtualization unit 105 and the virtual device emulating the input/output device of the deployer server 104F. The input data from the virtual device emulated as an input/output device of the deployer server 104F is converted into the data recognizable by the real device of the deployee server and output to the real device of the deployee server. Conversely, the input data from the real address of the deployee server is converted into the data recognizable by the virtual device and output to the virtual device of the virtual server.

In the case where the virtual server 106 has a hardware configuration included in the tolerance list 602, a plurality of candidates may exist. In the case where the tolerance list shown in FIG. 11 is available, for example, the candidates for NIC emulated on the virtual server 106 include NIC1 and NIC2. In such a case, the shortage of the function or performance is eliminated to assure the positive operation after deployment by selecting the NIC high in performance value 1103 or the NIC having a wealth of the functions 1104.

In step 2005, the deployee server unit 104 is restarted to activate the virtualization unit 105. In step 2006, the virtual server generating unit 203 ignores the network boot request issued at the time of activating the deployee server unit 104T. As a result, the deployment to the deployee physical server unit 104 is prevented, and the deployment to the virtual server 106 becomes possible. The virtualization unit 105, once activated, generates the virtual server 106 in accordance with the configuration determined in step 2004.

In step 2007, the information on the virtual CPU, the virtual memory, the virtual disk and the virtual device are recorded as the allotted resources of the column 804 of the virtual server management table 113 from the configuration information of the virtual sever determined in step 2004 by the virtual server generating unit 203 and used for generating the virtual server 106 in step 2006. Also, the virtual server generating unit 203 identifies the physical server from the information in the deployee server unit held by the configuration information acquisition unit 206 as of this time point, and adds the information in the column 706 of the server management table 111 to the effect that the virtualization mechanism is used.

By the network booting of the virtual server 106, the hardware configuration information of the virtual server 106 is acquired and the deployment to the virtual server is started (step 2008). By executing this process flow, the virtual server can be generated for deployment.

This embodiment is also applicable to a large scale-out at a data center. In the case where the image is ported from a data center having a backup to another data center where it is deployed, for example, it is bothersome to conduct the previous investigation of the correct configuration as a deployee machine. If a deployable range is widened by use of this invention, however, the deployee machine purchase is required to be checked only to a smaller degree and choices are increased. Thus, the deployment using the same backup image at different data centers becomes possible.

This embodiment is also applicable to the network booting. In the network booting (net boot), the disk images 108 (starting disk) stored in the storage unit 101 are read into the memory of the server unit 104 thereby to activate the server unit 104. By network booting from one disk image 108, a plurality of server units 104 can be started.

The network booting includes a method in which the management server 102 determines whether the network booting is possible or not and a method in which the server unit 104 determines whether the network booting is possible or not. In the method using the management server 102 for determination, the server unit 104 transmits a network booting request to the management server 102. Also, the hardware configuration information of the local server unit 104 is transmitted to the management server 102 (corresponding to step 1802).

The management server 102, upon receipt of the network booting request, compares the received hardware configuration of the server unit 104 with the hardware configuration information 601 of the disk images 108 (corresponding to step 1804 and subsequent steps). After that, the same process is executed as in step 1804 and subsequent steps. In the case where the hardware configurations are coincident (corresponding to step 1805), the network booting is executed, and the server unit 104 acquires the disk image 108 and develops it on the memory (corresponding to step 1810).

In the case where the hardware configurations fail to coincide and the difference device is existent on the tolerance list, then the network booting is executed (corresponding to step 1806). In the case where the difference device is not existent in the tolerance list, on the other hand, the image deployment unit accesses the disk image reconstruction unit 207 (corresponding to step 1807) thereby reconstruct the disk image 108 to be booted by network (step 1905). After that, the network booting is executed, and the server unit 104 acquires the reconstructed disk image 108 and develops it on the memory (corresponding to step 1810).

According to the method in which the server unit 104 determines whether the network booting is possible or not, on the other hand, the server unit 104 acquires both the hardware configuration information of the local server and the hardware configuration information 601 in the disk image 108 to be booted by network, compares them with each other as in steps 1804 and subsequent steps. In the case where the configurations are the same (step 1805), the network booting is executed, so that the server unit 104 acquires the disk images 108 and develops it on the memory (corresponding to step 1810).

In the case where the configurations are different, on the other hand, the server unit 104 acquires the tolerance list in the disk images 108. In the case where the tolerance list thus acquired contains the difference device (corresponding to step 1806), the server unit 104 executes the network booting directly. In the case where the difference device is not contained in the tolerance list, on the other hand, the image deployment unit accesses the disk image reconstruction unit 207 (corresponding to step 1807), and reconstructs the disk image 108 to be booted by network (step 1905). After that, the network booting is carried out, and the server unit 104 acquires the reconstructed disk image 108 and develops it on the memory (corresponding to step 1810).

Also, the virtual server can be used in the same manner as in the deployment. After generating the virtual server, the network booting is carried out, and the server unit 104, by acquiring the disk image 108, develops it on the memory of the virtual server.

As described above, according to this embodiment, the requirements for both the network booting and the deployment can be met at the same time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A deployment method executed by a management computer, comprising the steps of:
    said management computer acquiring hardware information including input/output information for input/output devices of an image acquiring computer and hardware information that includes driver information of said input/output devices from the image acquiring computer;
    holding a disk image of the image acquiring computer and the hardware information of the image acquiring computer in correspondence with each other in a storage unit;
    transferring configuration information acquisition agent to a deployee computer to acquire the hardware information including input/output device information of the deployee computer;

comparing the hardware information of the deployee computer with the hardware information of the image acquiring computer; and determining whether the disk image is to be deployed or not to the deployee computer, based on the result of the comparison.

2. The deployment method according to claim 1, further comprising the step of:

deploying the disk image to the deployee computer in the case where the comparison shows that the respective hardware information have the configurations corresponding to each other.

3. The deployment method according to claim 2, further comprising the steps of:

holding the driver information on the driver of the hardware of the image acquiring computer;

holding, as tolerance information, the hardware information extracted based on the driver information and corresponding to the driver of the hardware;

in the case where the comparison shows that the configurations of the respective hardware information fail to correspond to each other, judging whether the non-corresponding hardware of the deployee computer is included in the tolerance information or not; and deploying the disk image to the deployee computer in the case where the judgment shows that the non-corresponding hardware is included in the tolerance information.

4. The deployment method according to claim 3, further comprising, in the case where the judgment shows that the non-corresponding hardware is not included in the tolerance information, the steps of:

acquiring the driver of the non-corresponding hardware from a driver storage unit for storing the driver;

reconstructing the disk image of the image acquiring computer including the acquired driver; and deploying the reconstructed disk image to the deployee computer.

5. The deployment method according to claim 3, further comprising, in the case where the judgment shows that the non-corresponding hardware is not included in the tolerance information, the steps of:

instructing the deployee computer to activate a virtualization unit for emulating the virtual hardware corresponding to the hardware of the image acquiring computer and a virtual computer having the virtual hardware;

deploying the disk image to the virtual computer of the deployee computer; and converting the input/output data of the hardware of the deployee computer into the input/output data of the virtual hardware through the virtualization unit.

6. The deployment method according to claim 1, wherein the hardware is an input/output device.

7. A management computer comprising:

a processor;

a memory;

a configuration information acquisition unit for acquiring hardware information including input/output information for input/output devices of an image acquiring computer and hardware information that includes driver information of said input/output devices from the image acquiring computer, and transferring configuration information acquisition agent to a deployee computer to acquire the hardware information including input/output device information of the deployee computer;

an image backup unit for generating a disk image of the image acquiring computer and storing the disk image in correspondence with the hardware information of the image acquiring computer in a storage unit; and an image deployment unit for comparing the hardware information of the deployee computer with the hardware information of the image acquiring computer, and based on the comparison result, judging whether the disk image is to be deployed to the deployee computer or not.

8. The management computer according to claim 7, wherein the disk image is deployed to the deployee computer in the case where the judgment result shows that the respective hardware information has the configurations corresponding to each other.

9. The management computer according to claim 8, further comprising:

a tolerance information generating unit for extracting, as tolerance information, the hardware information with a corresponding hardware driver extracted based on the driver information acquired by the image backup unit and held in the image acquiring computer;

wherein the image deployment unit, in the case where the comparison result shows that the respective hardware information have configurations not corresponding to each other, judges whether the non-corresponding hardware of the deployee computer is included or not in the tolerance information, and in the case where the judgment result shows that the non-corresponding hardware is included in the tolerance information, deploys the disk image to the deployee computer.

10. The management computer according to claim 9, further comprising:

a deployed image reconstruction unit for acquiring the driver of the non-corresponding hardware from the driver storage unit in the case where the judgment result shows that the non-corresponding hardware is not included in the tolerance information, and reconstructing the disk image of the image acquiring computer including the driver, wherein the image deployment unit of the management computer deploys the reconstructed disk image to the deployee computer.

11. The management computer according to claim 9, further comprising:

a virtual computer generating unit for instructing the deployee computer to activate a virtualization unit for emulating the virtual hardware corresponding to the hardware of the image acquiring computer and converting the input/output data of the deployee computer to the input/output data of the virtual hardware, and a virtual computer having the virtual hardware;

wherein the image deployment unit of the management computer deploys the disk image to the virtual computer of the deployee computer in the case where the judgment result shows that the non-corresponding hardware is not included in the tolerance information.

12. The management computer according to claim 7, wherein the hardware is an input/output device.

13. A computer system comprising a management computer including:

a processor;

a memory;

a configuration information acquisition unit for acquiring hardware information including input/output information for input/output devices of an image acquiring computer and hardware information that includes driver information of said input/output devices from the image acquiring computer, and transferring configuration information acquisition agent to a deployee computer to acquire the hardware information including input/output device information of the deployee computer;

an image backup unit for generating a disk image of the image acquiring computer and storing the disk image in correspondence with the hardware information of the image acquiring computer in the storage unit; and an image deployment unit for comparing the hardware information of the deployee computer with the hardware information of the image acquiring computer, and based on the comparison result, judging whether the disk image is to be deployed to the deployee computer or not.

14. The computer system according to claim 13, wherein in the case where the comparison result shows that the respective hardware information have configuration corresponding to each other, the image deployment unit of the management computer deploys the disk image to the deployee computer.

15. The computer system according to claim 14, wherein the management computer includes a tolerance information generating unit for extracting, as tolerance information, the hardware information with a corresponding hardware driver extracted based on the driver information acquired by the image backup unit and held in the image acquiring computer;

wherein the image deployment unit of the management computer, in the case where the comparison result shows that the respective hardware information have configurations not corresponding to each other, judges whether the non-corresponding hardware of the deployee computer is included in the tolerance information, and wherein in the case where the judgment result shows that the non-corresponding hardware is included in the tolerance information, the disk image is deployed to the deployee computer.

16. The computer system according to claim 15, further comprising:

a deployment image reconstruction unit for acquiring the driver of the non-corresponding hardware from the driver storage unit and reconstructing the disk image of the image acquiring computer including the driver in the case where the judgment result shows that the non-corresponding hardware is not included in the tolerance information, wherein the image deployment unit of the management computer deploys the reconstructed disk image to the deployee computer.

17. The computer system according to claim 15, wherein the deployee computer includes:

a virtualization unit for emulating the virtual hardware corresponding to the hardware of the image acquiring computer and converting the input/output data of the deployee computer into the input/output data of the virtual hardware; and a virtual computer having the virtual hardware;

wherein the image deployment unit of the management computer deploys the disk image to the virtual computer of the deployee computer in the case where the judgment shows that the non-corresponding hardware is not included in the tolerance information.

18. The computer system according to claim 13, wherein the hardware is an input/output device.

19. The deployment method according to claim 1, wherein the configuration information acquisition agent is transferred to the deployee computer to perform acquisition of the hardware information on the deployee computer.

20. The deployment method according to claim 1, wherein the configuration information acquisition agent is transferred to the deployee computer to acquire the hardware information on the deployee computer, including processor and memory information of the deployee computer, disk information of a disk connected to the deployee computer, and device information of each device mounted on the deployee computer.

* * * * *